US008970810B2

(12) United States Patent
Bowser et al.

(10) Patent No.: US 8,970,810 B2
(45) Date of Patent: Mar. 3, 2015

(54) ELECTRONIC DISPLAY WITH INTERNAL LEDGES

(71) Applicant: Kent Displays Incorporated, Kent, OH (US)

(72) Inventors: Mathew Bowser, Hubbard, OH (US); Donald Davis, Conneaut Lake, PA (US); John Krinock, North Canton, OH (US)

(73) Assignee: Kent Displays Incorporated, Kent, OH (US)

( * ) Notice: Subject to any disclaimer, the term of this patent is extended or adjusted under 35 U.S.C. 154(b) by 117 days.

(21) Appl. No.: 13/754,481

(22) Filed: Jan. 30, 2013

(65) Prior Publication Data

US 2014/0211129 A1    Jul. 31, 2014

(51) Int. Cl.
*G02F 1/1345* (2006.01)
*G02F 1/1333* (2006.01)
*G02F 1/1334* (2006.01)
*G02F 1/1347* (2006.01)

(52) U.S. Cl.
CPC .......... *G02F 1/1333* (2013.01); *G02F 1/13336* (2013.01); *G02F 1/1334* (2013.01); *G02F 1/1347* (2013.01)
USPC .......................................................... 349/73

(58) Field of Classification Search
CPC ................................................. G02F 1/13452
USPC .......................................................... 349/73
See application file for complete search history.

(56) References Cited

U.S. PATENT DOCUMENTS

| 5,453,863 | A | 9/1995 | West et al. |
|---|---|---|---|
| 5,691,795 | A | 11/1997 | Doane et al. |
| 5,889,566 | A | 3/1999 | Wu et al. |
| 6,104,448 | A | 8/2000 | Doane et al. |
| 8,139,039 | B2 | 3/2012 | Schneider et al. |
| 8,228,301 | B2 | 7/2012 | Schneider |
| 8,310,630 | B2 | 11/2012 | Marhefka et al. |
| 2009/0033811 | A1 | 2/2009 | Schneider |
| 2009/0096942 | A1 | 4/2009 | Schneider et al. |
| 2010/0245221 | A1 | 9/2010 | Khan |
| 2010/0265214 | A1 | 10/2010 | Green et al. |
| 2012/0099030 | A1 | 4/2012 | Pishnyak |
| 2013/0070184 | A1 | 3/2013 | Morris et al. |
| 2013/0314622 | A1* | 11/2013 | Braganza et al. ............... 349/12 |
| 2013/0342432 | A1* | 12/2013 | Schneider et al. ............. 345/89 |

OTHER PUBLICATIONS

E. Montbach, et al. Novel Flexible Reflex Displays, Proceedings of SPIE, 7232, 723203, 2009.

* cited by examiner

*Primary Examiner* — Timothy L Rude
(74) *Attorney, Agent, or Firm* — Pearne & Gordon LLP

(57) ABSTRACT

An electronic display comprises an electro-optic layer comprising electro-optical material. The display includes a first electrically conductive layer and a second electrically conductive layer, the electro-optic layer being disposed between the first electrically conductive layer and the second electrically conductive layer. A first substrate is disposed adjacent the first electrically conductive layer and a second substrate is disposed adjacent the second electrically conductive layer. The first substrate and the second substrate are formed in a shape that has at least one outer peripheral edge boundary, excluding any ledges. Internal ledges are disposed inside the at least one outer peripheral edge boundary. A first of the internal ledges comprises a portion of the first substrate and an exposed portion of the first electrically conductive layer and a second of the internal ledges comprises a portion of the second substrate and an exposed portion of the second electrically conductive layer.

41 Claims, 21 Drawing Sheets

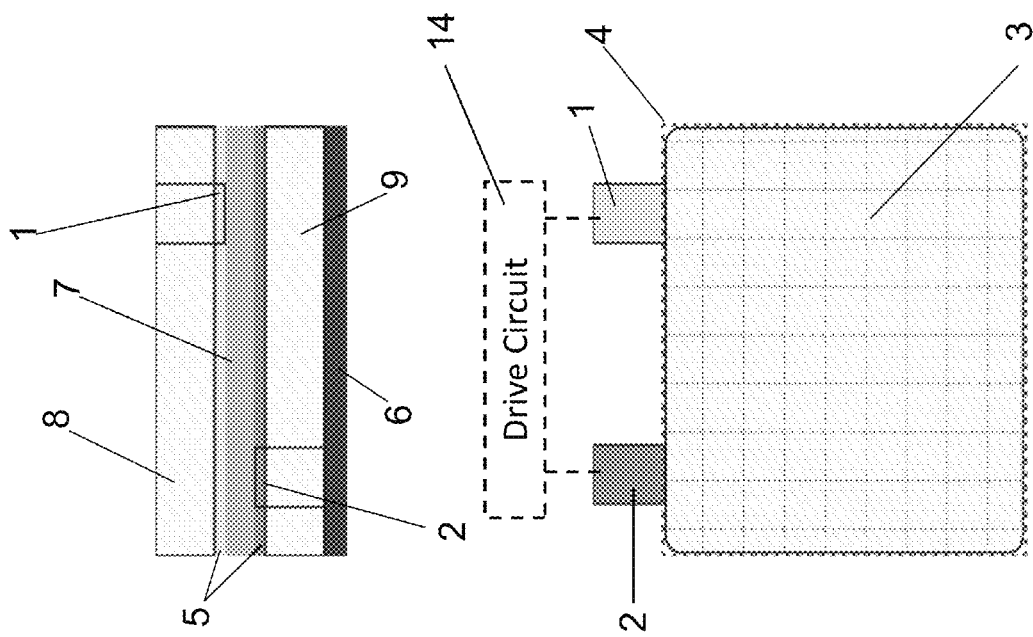

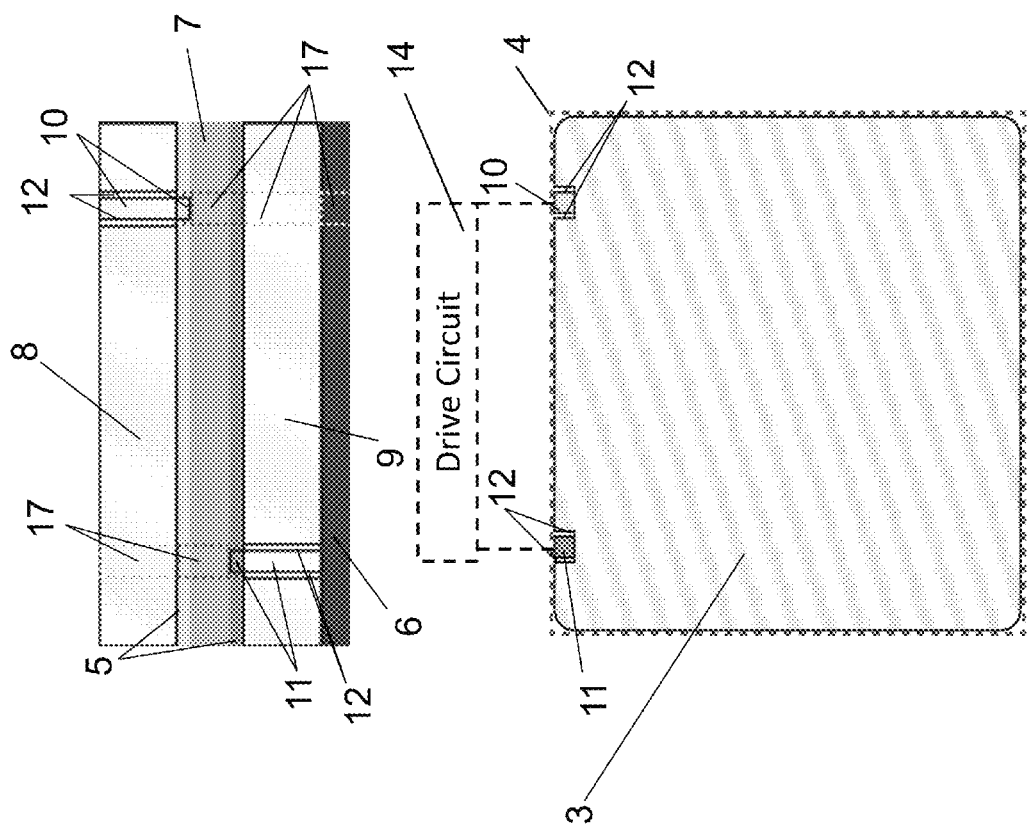

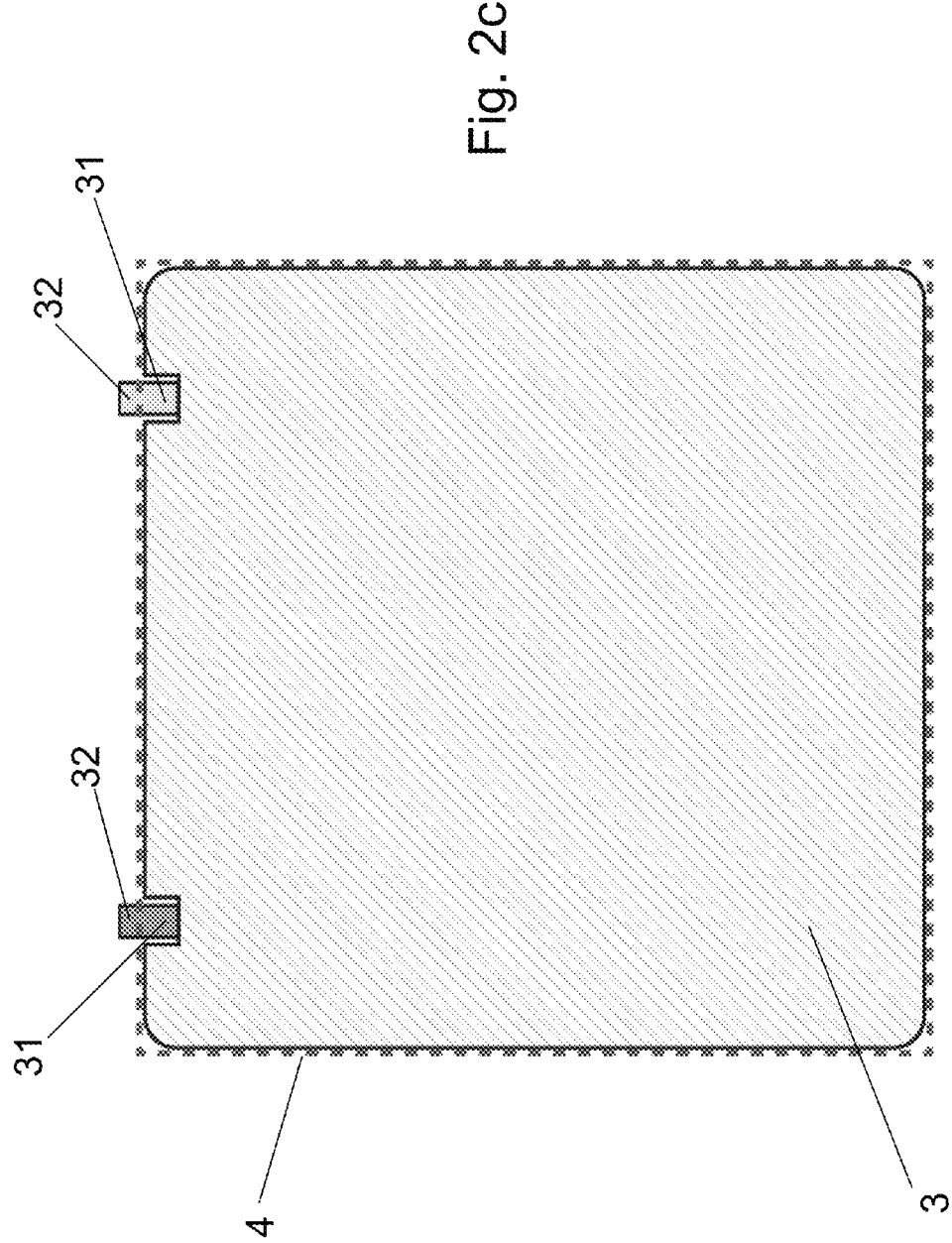

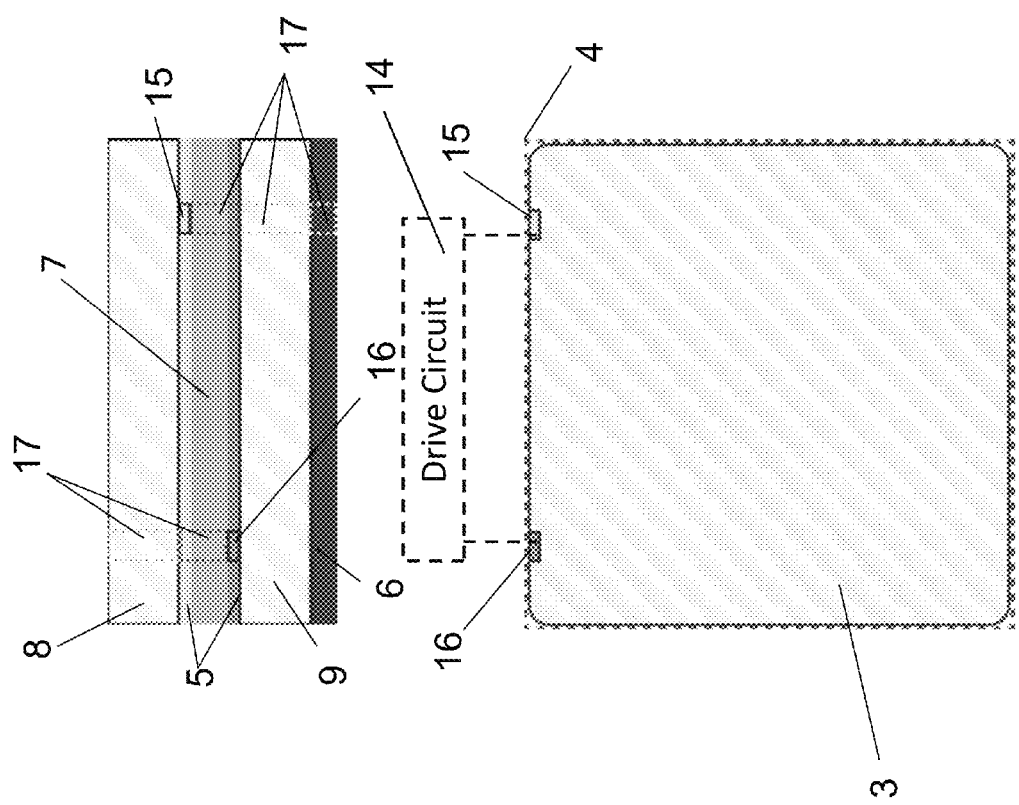

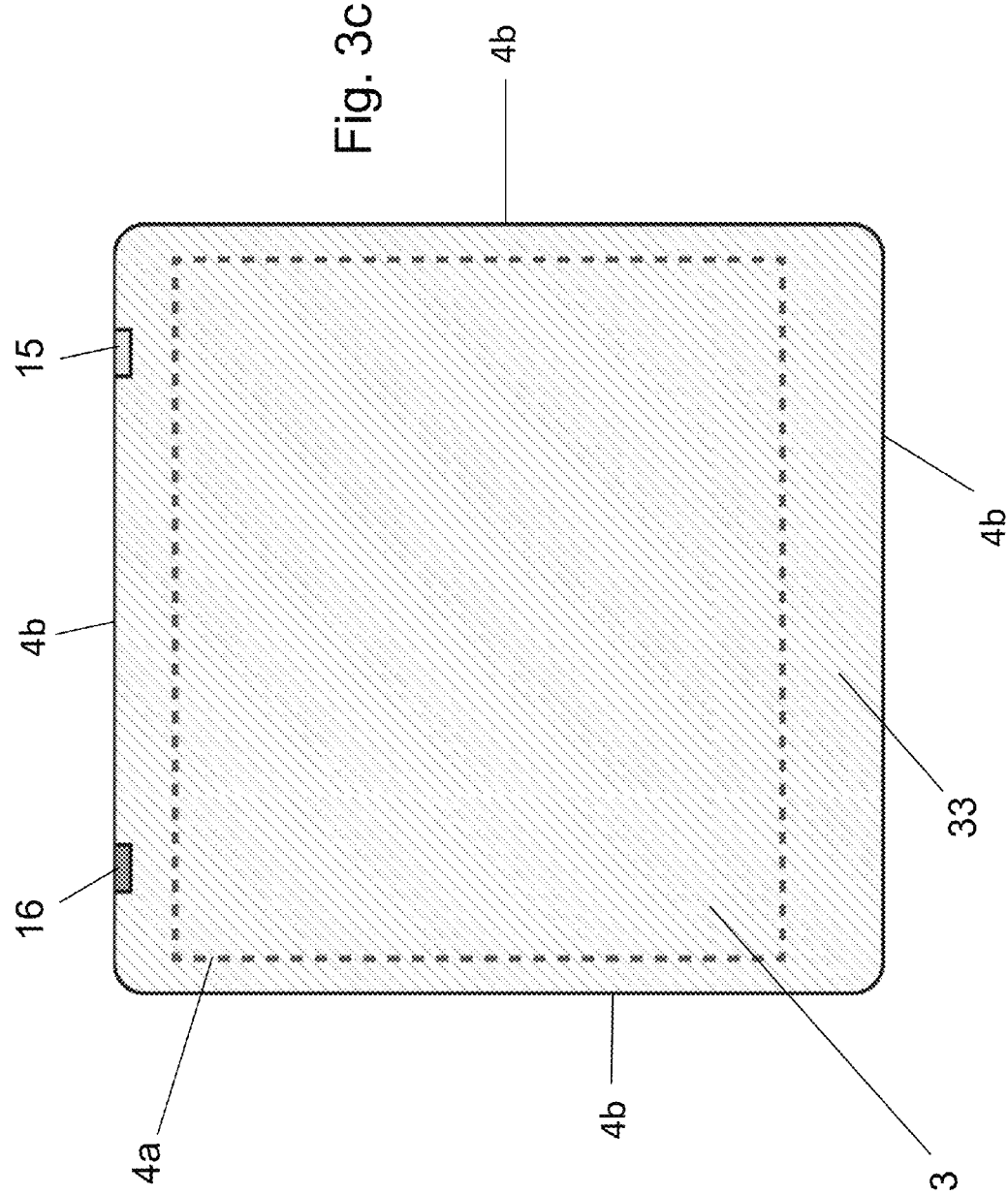

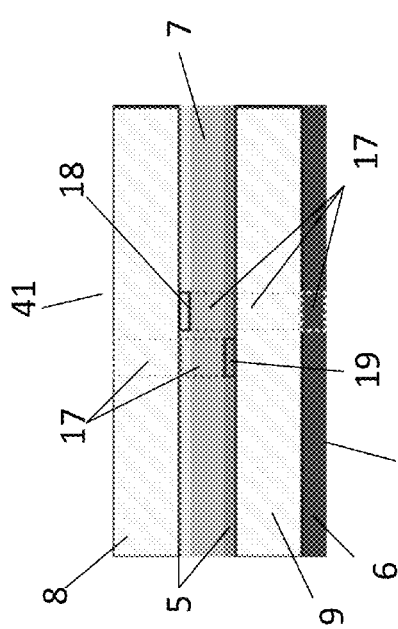
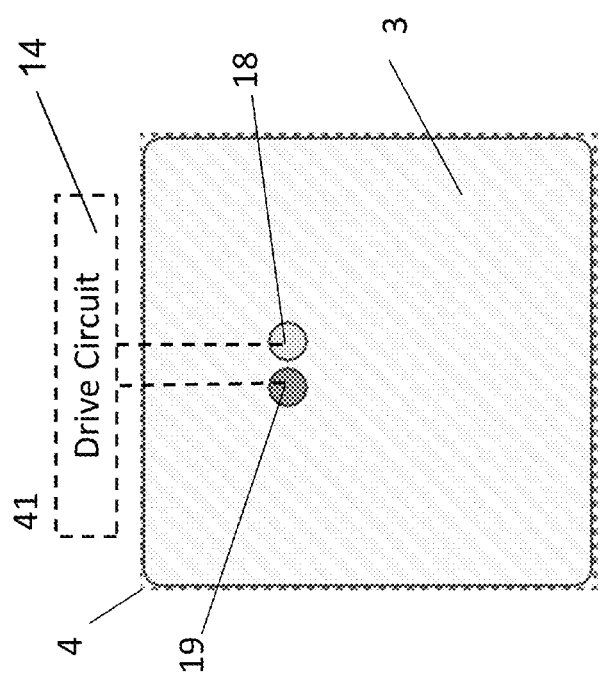

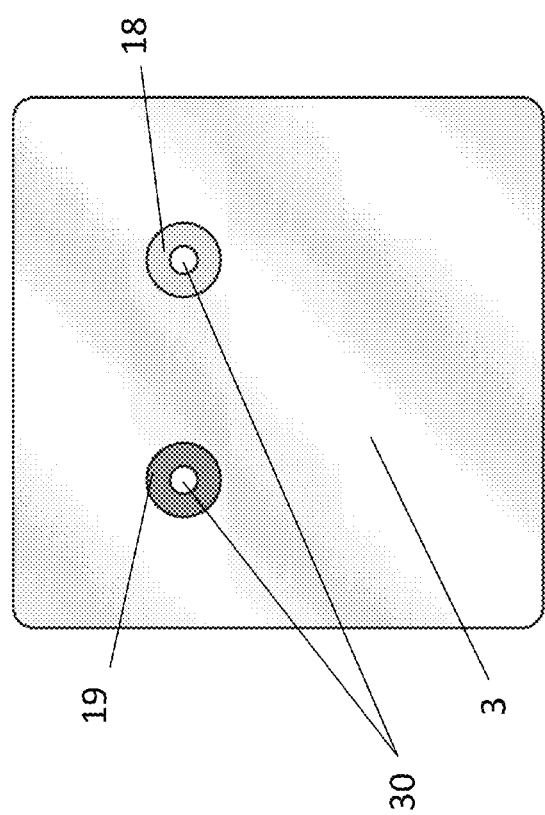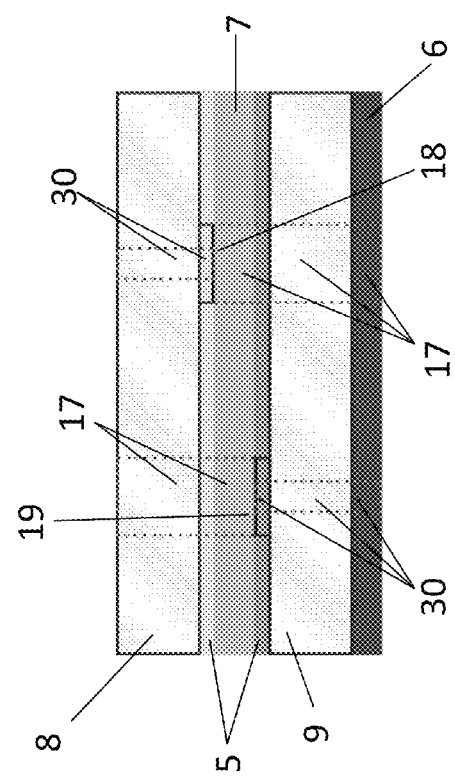

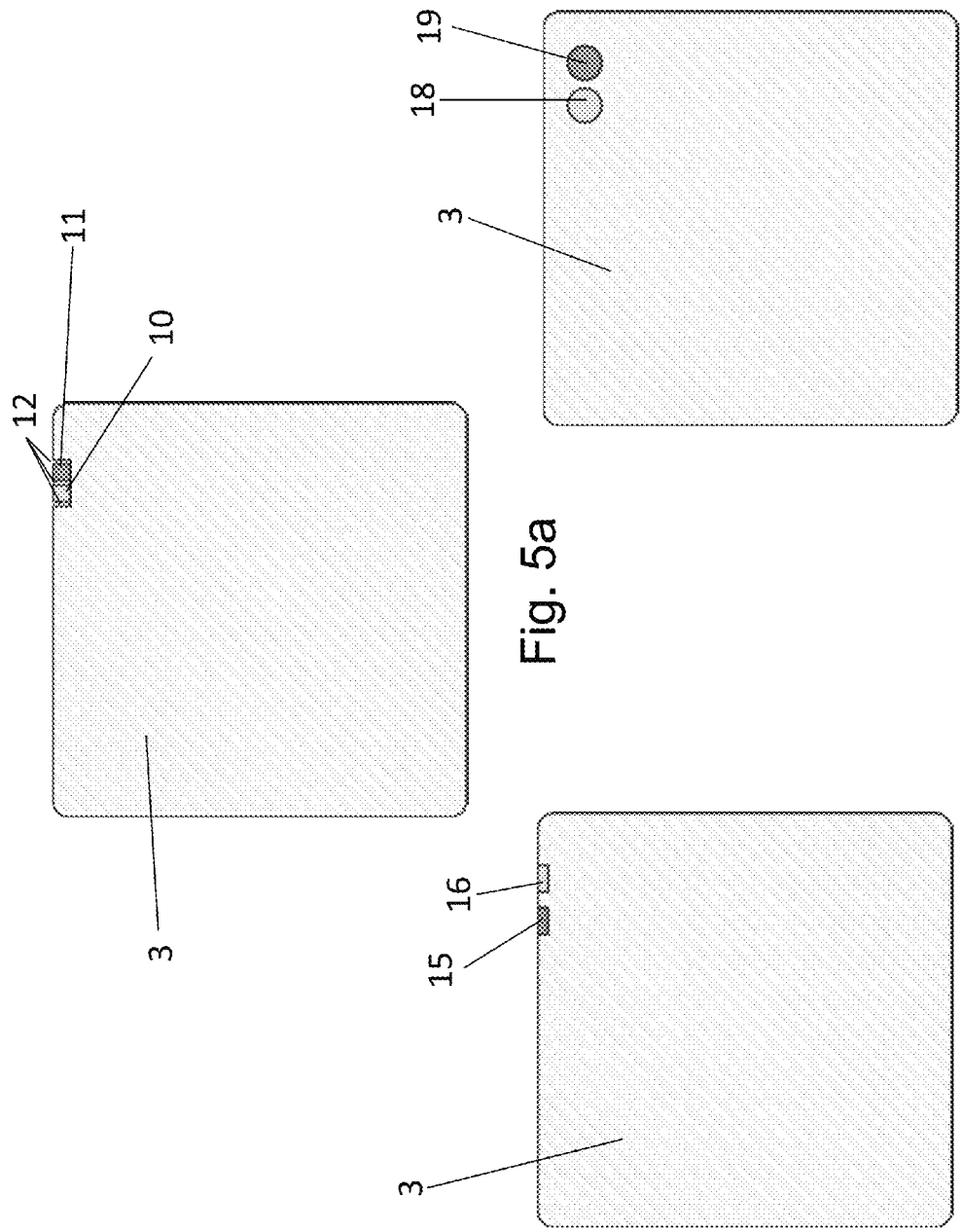

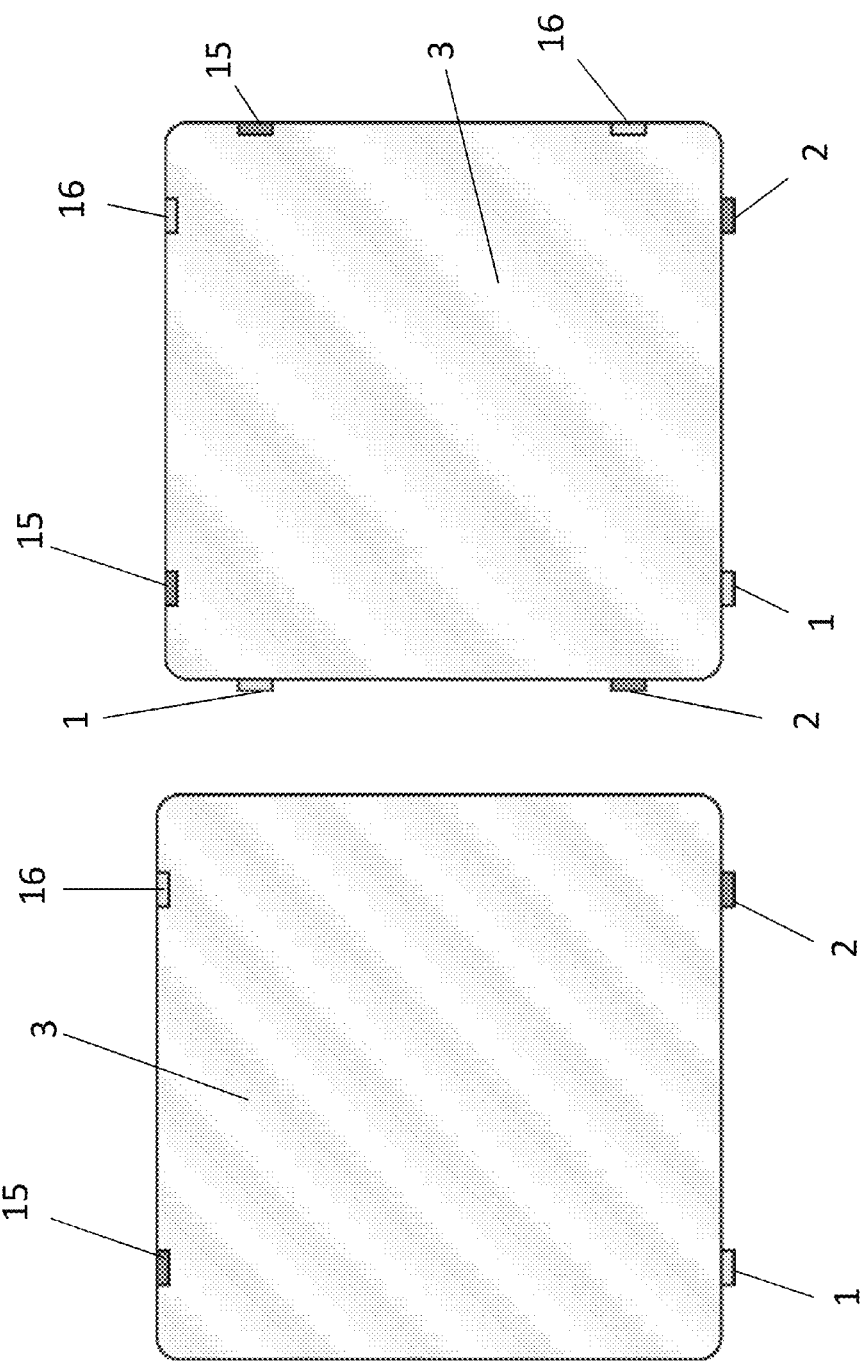

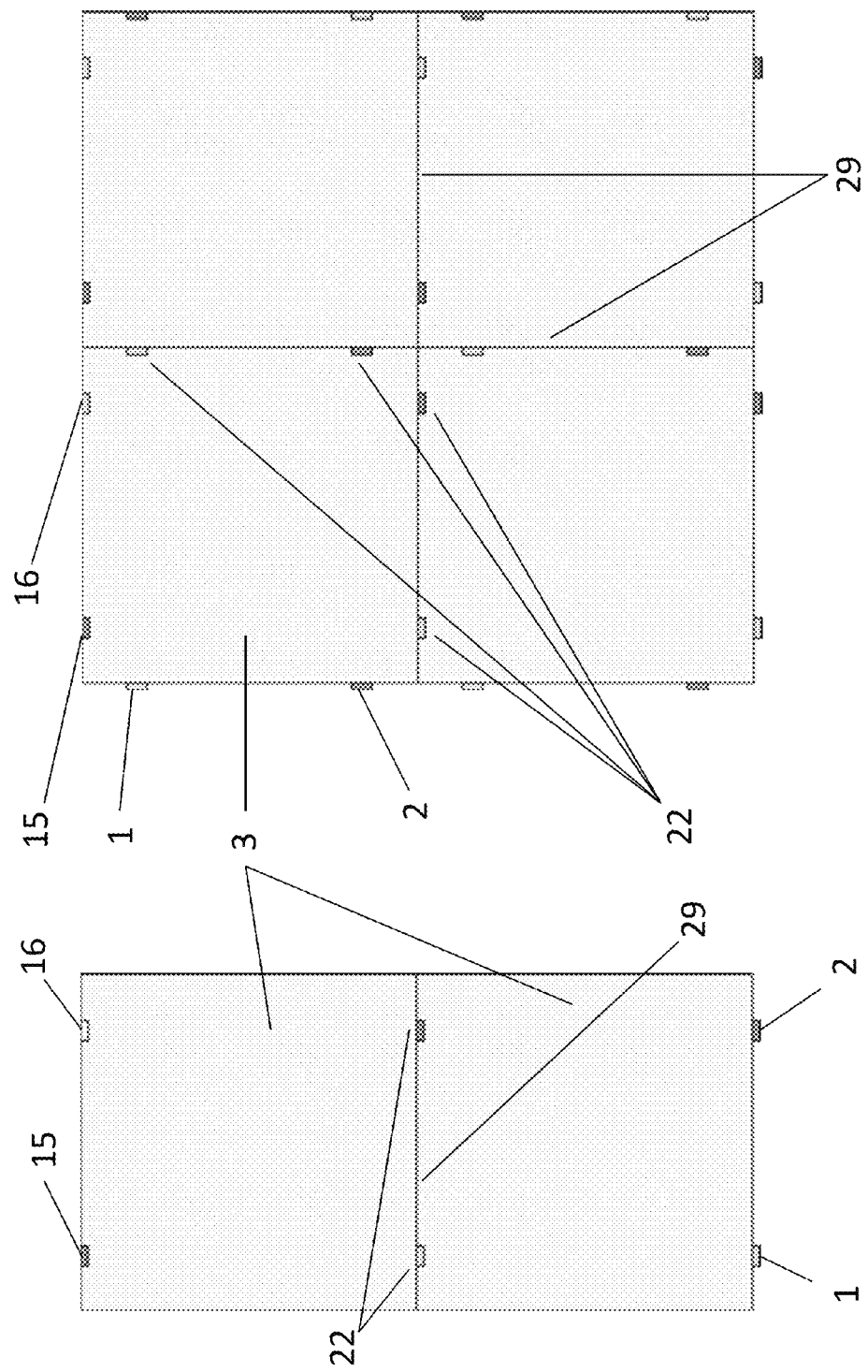

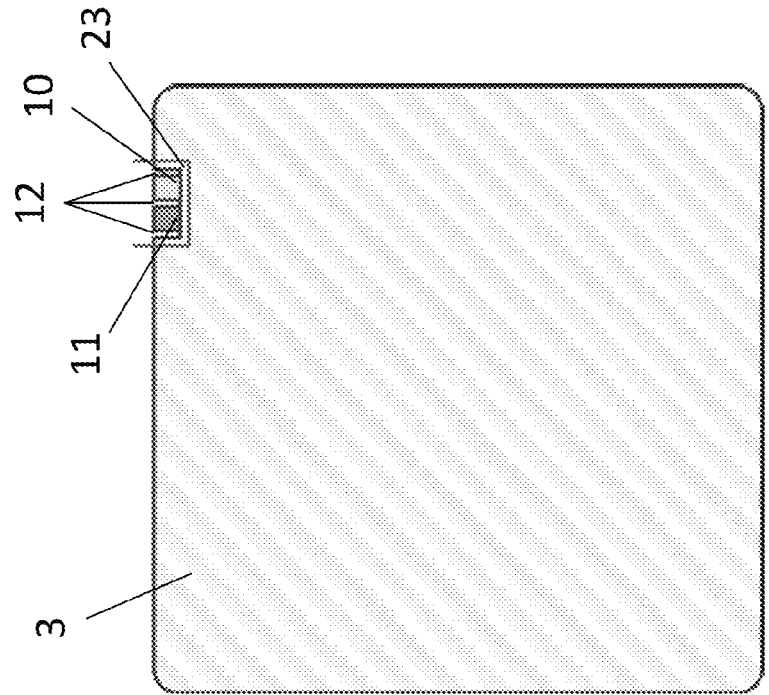
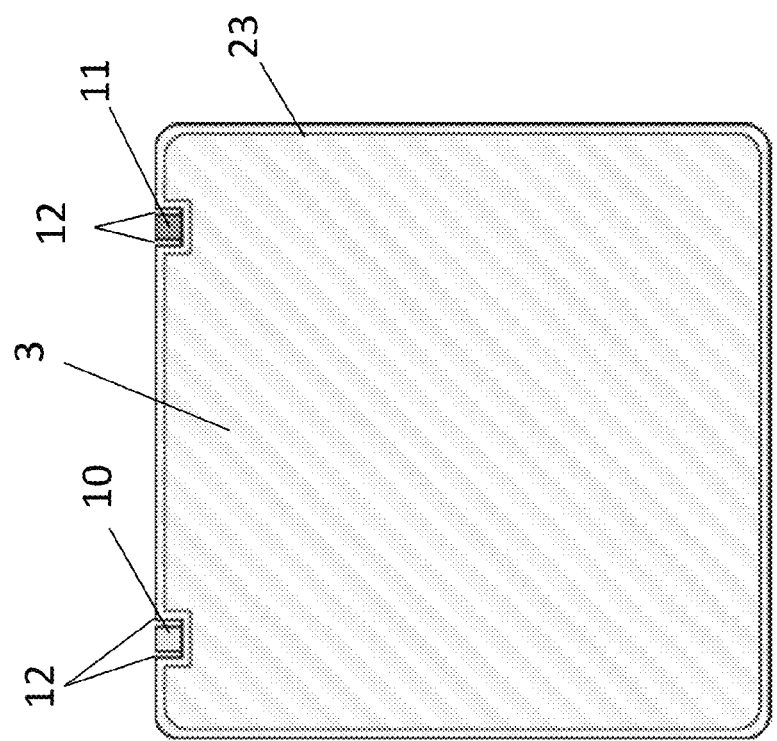

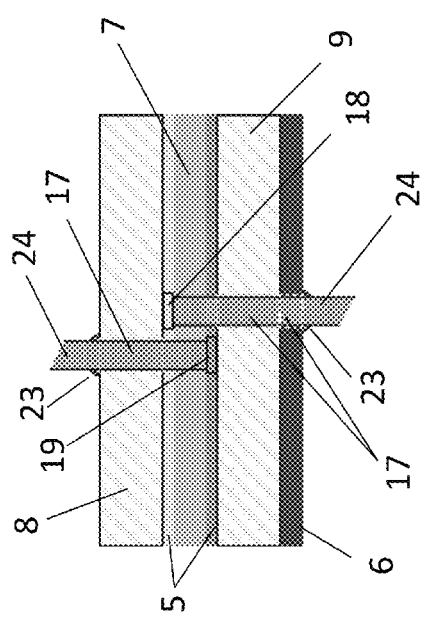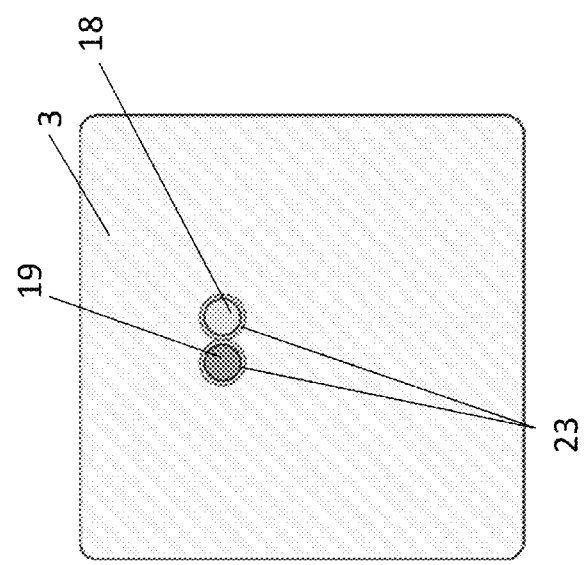
Fig. 13b
Fig. 13a

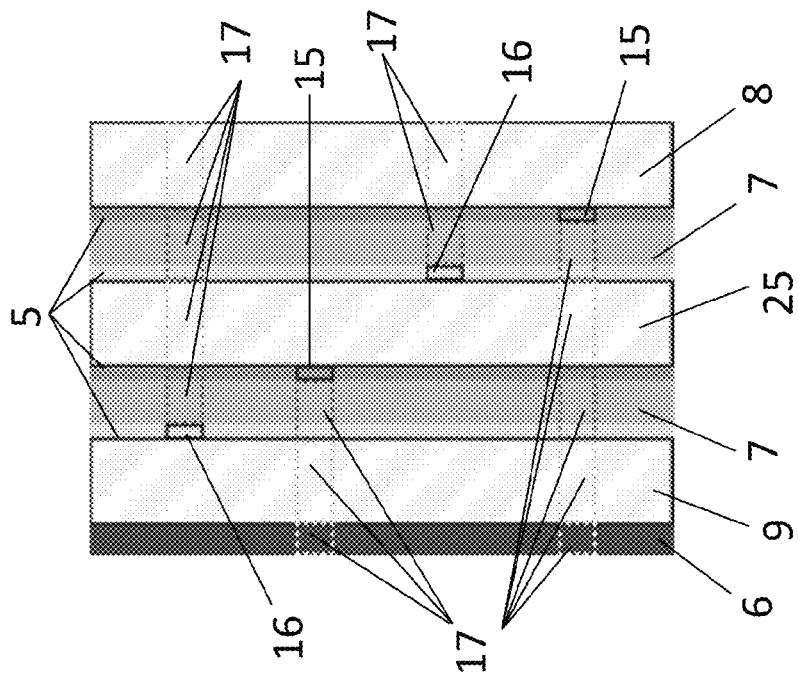
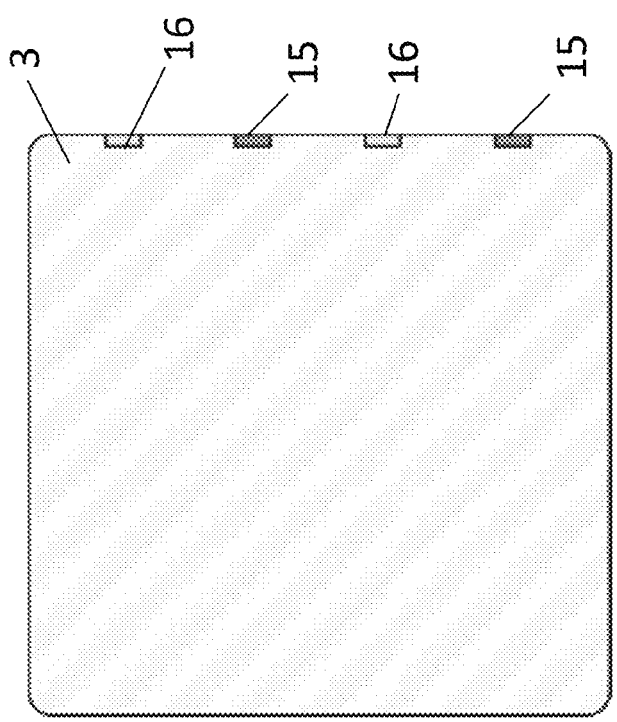
Fig. 14a
Fig. 14b

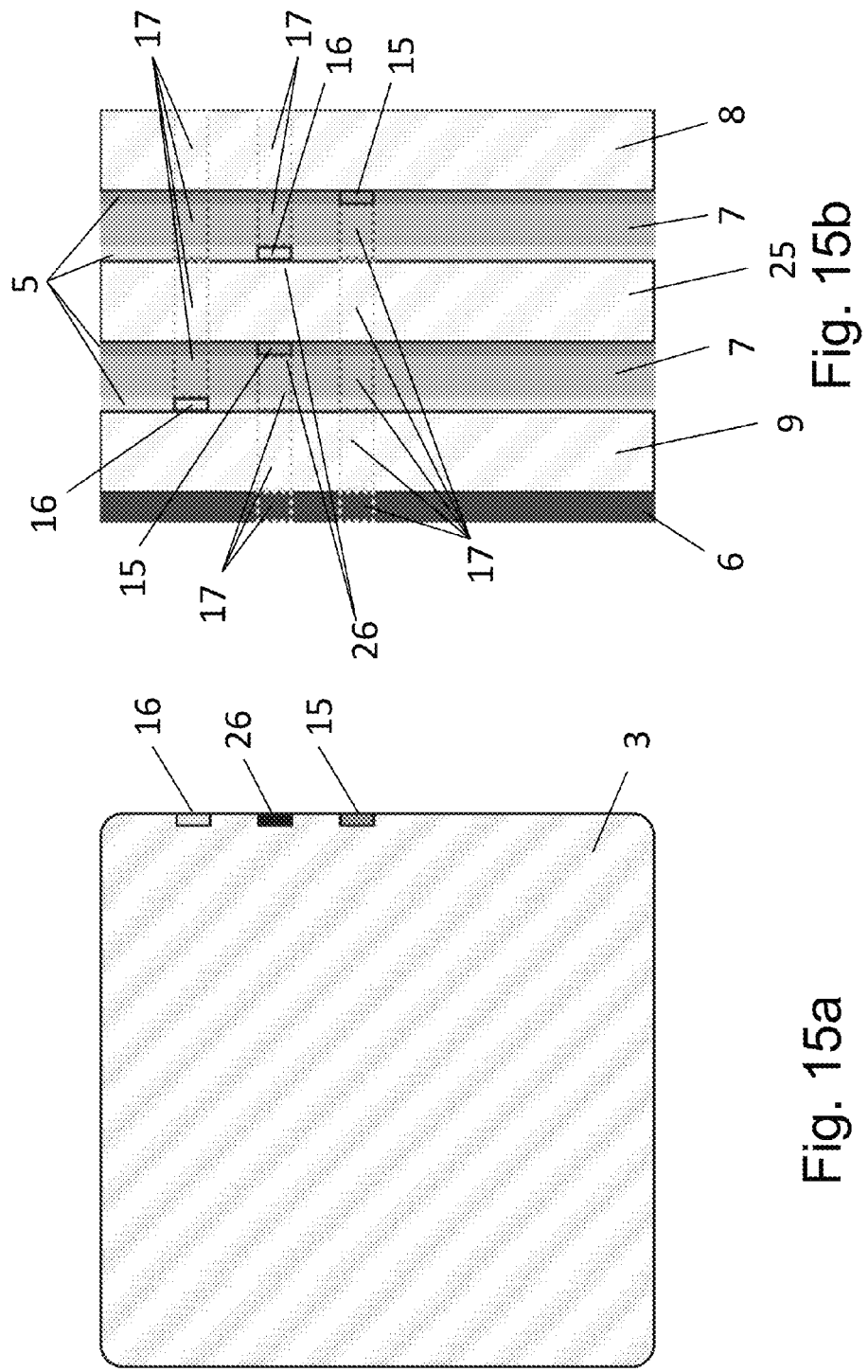

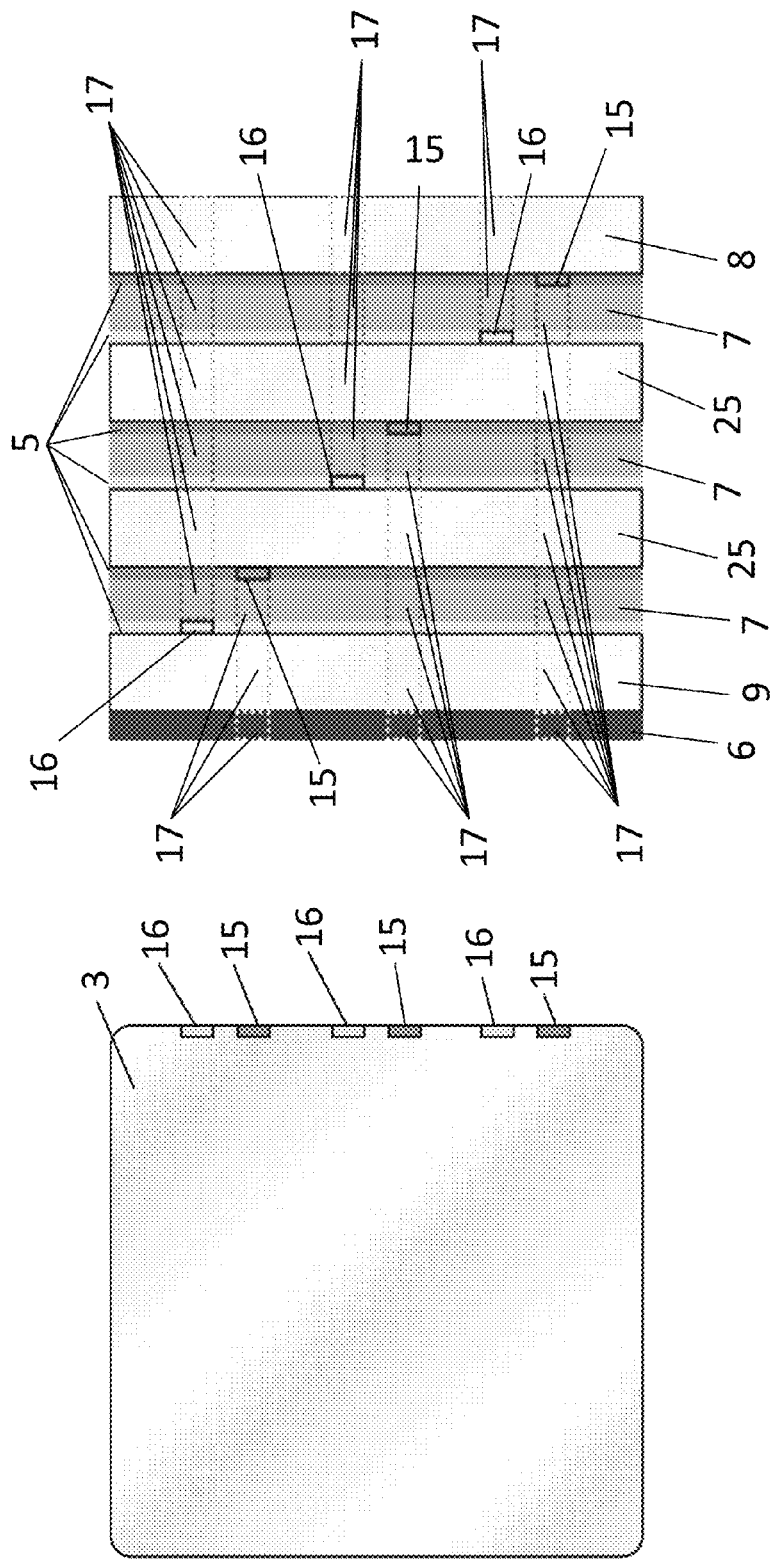

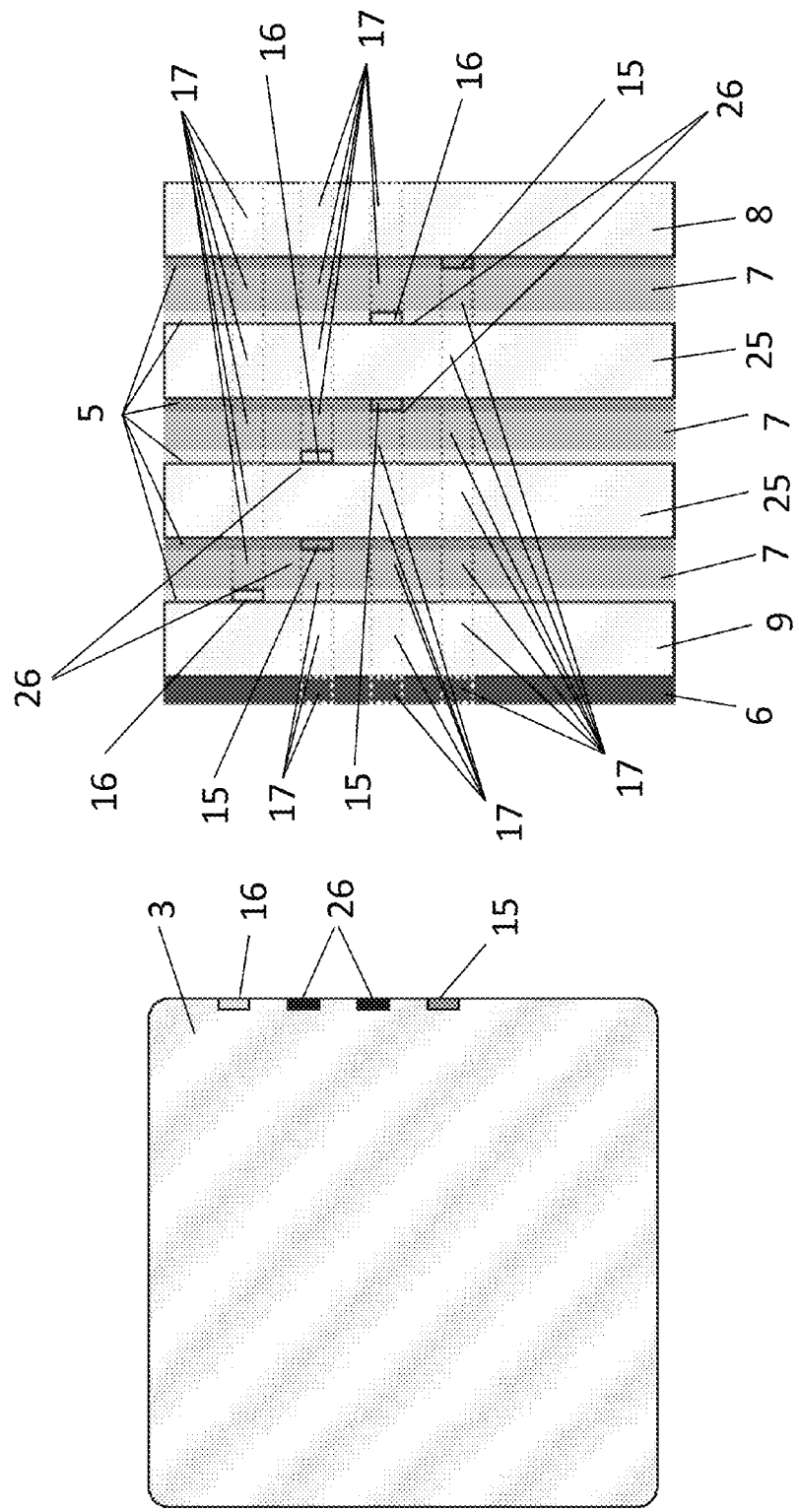

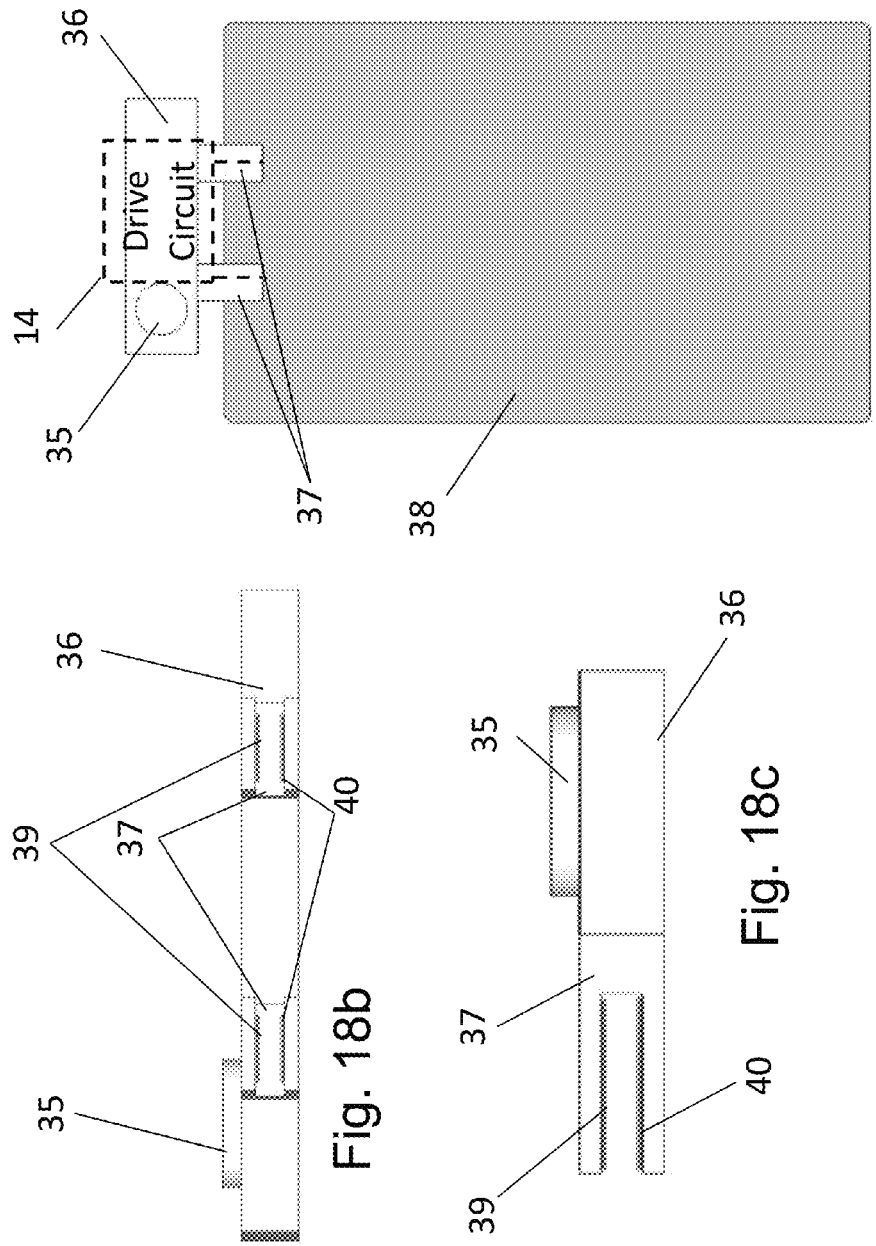

ELECTRONIC DISPLAY WITH INTERNAL LEDGES

TECHNICAL BACKGROUND

In a plastic electro-optic display, the ledge region exposes the conductive layer of each substrate for the purpose of electrically connecting the conductive layer to drive and control electronics. As plastic display requirements continue to evolve, ledge regions must follow suit. For example, two types of plastic displays that are currently manufacturable at Kent Displays, Inc. are writing tablets or eWriters and electronic skins. Current plastic ledges on these cholesteric liquid crystal displays generally include two rectangular shapes each including a substrate portion extending from one of the display sides. One of these ledges is connected to the top electrically conductive film while one is connected to the lower electrically conductive film. An illustration of such a current display layout can be seen in FIG. 1 (Prior art). In the case of electronic skins and some eWriters such as the Boogie Board®, see for example E. Montbach, et al, *Proceedings of SPIE,* 7232, 723203, (2009), which is incorporated herein by reference in its entirety, the drive electronics is integral with or permanently connected to the display. However, the writing tablet may be in the form of Liquid Crystal Paper (see U.S. patent application Ser. No. 13/621,367, which is incorporated herein by reference in its entirety) where the drive electronics needed to erase the paper are external to (not designed to be permanently attached to) the writing tablet device.

BRIEF DESCRIPTION OF EXAMPLE EMBODIMENTS

This disclosure features changing the placement of ledges in an electronic display. The substrates of the display are formed in a shape of the outer periphery of the display that has at least one outer peripheral edge boundary, excluding any ledges. Reference to at least one outer peripheral edge can mean only one edge or multiple edges of the display or all of the edges that together make up the outer periphery of the display. The active area is defined herein as an area of the display as seen in a top or bottom view of the display, bounded at its perimeter by an active area boundary, in which there are two opposing electrically conductive layers with electro-optical material disposed between them, which is visible to the observer (i.e., not covered up by a housing or bezel of the device) and/or able to be interacted with (e.g., the surface of the device that can be written on in the case of a writing tablet). The active area may extend substantially to the at least one outer peripheral edge boundary, excluding any ledges, or can be located inwardly therefrom. Instead of the ledges extending only outside of the display perimeter as in the prior art display shown in FIG. 1, the active area boundary being represented by the dotted line 4 and extending substantially to all of the outer peripheral edge boundaries in FIG. 1, the ledges of this disclosure are internal ledges that are located within or inside the outer periphery of the display (within the at least one outer peripheral edge boundary) and/or can extend to or within the active area boundary. This will result in, for example, a majority of the area of the ledges, or an entire area of the ledges, within the at least one outer peripheral edge boundary and also possibly within the active area boundary (FIGS. 2, 3a, 3b and 4-6). The internal ledges of this disclosure can be completely within the at least one outer peripheral edge boundary (i.e., within one, within more than one, or within all peripheral edge boundaries of the display). Or the internal ledges can be located within the at least one outer peripheral edge boundary and extend beyond the at least one outer peripheral edge boundary. For example, the majority of the area of the ledge can be located within the at least one outer peripheral edge boundary and a portion of the area of the ledge can be located outside the outer peripheral edge boundary. When the ledges are rectangular, the active area can extend around and be in proximity with one, two, three or four sides of the ledges. When the ledge is circular, the active area can be located in proximity with a portion of or the entire circumference of the ledge so as to surround the circular ledge.

Two substrates form outer surfaces of the display in the active area notwithstanding the ledges between which the liquid crystal and electrically conductive layers sandwiching it are disposed. The substrates are typically much thicker than any of the other layers of the display but can be any thickness that is sufficient to support the internal ledge. Within the active area boundary the electro-optical material changes its optical state when a voltage is applied to the electrically conductive layers on each of the internal ledges and/or when writing pressure is applied to one side of the display. The display can include drive electronics for applying this voltage. In all aspects herein the term "drive electronics" means drive and/or control electronics). The ledges are not considered to compose the active area although they are located completely or partially within the active area boundary. In some instances the ledges may be completely outside of the active area boundary. The active area boundary can substantially follow the outer perimeter of the display notwithstanding the ledges as shown by dotted lines in the drawings (i.e., the active area boundary not traveling along the recessed substrates forming the internal ledges) or, as discussed above, can be located inwardly of the at least one outer peripheral edge boundary, not including the ledges. Typically, the active area will extend substantially all the way to the at least one outer peripheral edge of the display (e.g., the active area boundary substantially coinciding with one, more than one, or all outer peripheral edge boundaries of the display, excluding ledges).

All of the substrates and electrically conductive layers are usually optically clear or transparent. However, substrates and electrically conductive layers below the lowest electro-optic layer, need not be optically clear or transparent but should be nonreflective. All of the internal ledges are also usually optically clear or transparent, but need not be when located below the lowest electro-optic layer in which case they should be nonreflective. A light absorbing (e.g., black) back layer may be disposed at a bottom of the display so as to absorb light passing through the electro-optic layer(s).

By locating the internal ledges within the display outer peripheral edge boundary, advantages are achieved. For example, there no longer are sensitive extremities (ledges) extending away from the display. By bringing these ledge regions inside the display active area (e.g., when the active area boundary substantially coincides with the at least one outer peripheral edge boundary), the display perimeter protects the ledge from damage. This format also reduces the overall footprint the displays occupy.

Turning now to various aspects of this disclosure, a first general aspect features an electronic display comprising an electro-optic layer including electro-optical material, a first electrically conductive layer and a second electrically conductive layer. The electro-optic layer is disposed between the first and second electrically conductive layers. A first substrate is disposed adjacent the first electrically conductive layer and a second substrate is disposed adjacent the second electrically conductive layer. The first and second substrates are formed in a shape that has at least one outer peripheral edge boundary, excluding any ledges. Reference to the substrates being formed in a shape that has at least one outer peripheral edge boundary, "excluding any ledges," means that the shape of the substrate around a ledge (e.g., around an internal ledge) is ignored when considering what is meant by the at least one outer peripheral edge boundary (e.g., see the dotted line of the outer peripheral edge boundary passing by the internal ledges in FIG. 2a in alignment with the remainder of that edge of the display); but this of course does not mean that the display includes no ledges. Internal ledges are disposed inside the at least one outer peripheral edge boundary (e.g., within all outer peripheral edge boundaries of the display that form the display perimeter). A first of the internal ledges comprises a portion of the first substrate and an exposed portion of the first electrically conductive layer and a second of the internal ledges comprises a portion of the second substrate and an exposed portion of the second electrically conductive layer.

The active area defined above having an active area boundary can be formed by the electro-optic layer disposed between the first and second electrically conductive layers. The first and second internal ledges can extend to or be disposed inside the active area boundary. The active area boundary can be disposed substantially in alignment with the outer peripheral edge boundary of the display excluding ledges, or inwardly therefrom. In hybrid internal display ledges, the first and second internal ledges can extend within the at least one outer peripheral edge boundary and beyond the at least one outer peripheral edge boundary and/or the active area boundary. In one example, a majority of a side surface area of the first and second internal ledges can be located within the at least one outer peripheral edge boundary and/or within the active area boundary and a portion of a side surface area of each ledge is located outside the outer peripheral edge boundary and/or outside the active area boundary.

Referring now to specific features applicable to the first aspect of this disclosure, a gap can be located in the first substrate around one or more sides of the first internal ledge and a gap can be located in the second substrate around one or more sides of the second internal ledge (e.g., a Type 1 internal ledge as referred to below). On the other hand, there can also be no gap in the first substrate around the first internal ledge and no gap in the second substrate around the second internal ledge (e.g., a Type 2 internal ledge as referred to below). In yet another variation, the first and second internal ledges can be completely internal to the display such that the first and second internal ledges do not extend to the at least one peripheral edge of display (e.g., a Type 3 internal ledge as referred to below). It should also be appreciated that any combination of the above ledge types can be used together (e.g., a Type 1 ledge (on the top film or substrate) could be paired with a Type 2 ledge (on the bottom film or substrate).

Referring to further specific features, in a display suitable for tiling, at least one of the first and second internal ledges can be disposed near one of the outer peripheral edge boundaries, further comprising at least one external ledge that extends outside another one of the outer peripheral edge boundaries (e.g., what is referred to below as a "two sided" display). Alternatively, another display suitable for tiling can include two internal ledge sets each including the first and second internal ledges, the internal ledge sets extending near first and second outer peripheral edge boundaries, respectively, further comprising two external ledge sets each including external ledges, the external ledge sets extending outside third and fourth peripheral edge boundaries, respectively (e.g., what is referred to below as a "four-sided" display). Each of these edge boundaries corresponds to an edge of the display.

In another aspect the display is a tiling display comprising at least one selected internal ledge disposed at one location near the at least one outer peripheral edge boundary, and at least one ledge (e.g., an external ledge), spaced apart from the selected internal ledge, extending outside the at least one outer peripheral edge boundary at another location of the display. The at least one outer peripheral edge can be selected from the group consisting of: arcuate shaped, no straight edges, one straight edge, two straight edges; more than two straight edges and combinations thereof. The outer display perimeter can take on any shape.

Another specific feature is that the electronic display can comprise integrated drive electronics that apply a voltage or at least one voltage pulse to the exposed portion of the first electrically conductive layer of the first internal ledge and to the exposed portion of the second electrically conductive layer of the second internal ledge, to change an optical state of the electro-optical material. The integrated drive electronics are defined herein as those that are designed to be permanently attached to the exposed electrically conductive layers of the internal ledges and not capable of repeated electrical connection and disconnection therefrom. It is considered that the attachment of the drive electronics to the ledges, wherein a device for the attachment (e.g., a spring clip) could be removed but is inaccessible by being covered by a housing, is an example of the permanent attachment design. On the other hand, a spring clip that is not covered by a housing might be a permanent attachment or not. For example, where adhesive is also applied around the spring clip this could be a permanent attachment. On the other hand a spring clip by itself that is accessible on the display may be a non-permanent attachment. Other permanent and non-permanent ways to attach drive electronics to the display ledges would be apparent to those skilled in the art in view of this disclosure.

Further specific features are that the electro-optical material can comprise cholesteric liquid crystal material. Of course, the electro-optic material can comprise other suitable materials that can be electrically addressed so as to change its optic state. The cholesteric liquid crystal material can be dispersed in a polymer matrix. The display can comprise a layer of a light absorbing material that absorbs light that passes through the electro-optical material. The electronic display can include at least one other layer of cholesteric liquid crystal material stacked over the electro-optic (e.g., cholesteric liquid crystal) layer, and other layers of electrically conductive material between which the other layer of cholesteric liquid crystal material is disposed. Each layer of liquid crystal material may be driven separately and/or all layers of liquid crystal material may be driven together. The electro-optical material can comprise liquid crystal material containing an additive dichroic dye material.

Any combination of the above specific features may be included in the first aspect of the disclosure. In addition, any of the features disclosed in the Detailed Description and/or shown in the drawings can be used along with any of the above specific features in any combination.

A second general aspect of this disclosure features a multi-electro-optic layer electronic display comprising a first electro-optic layer comprising electro-optical material; the display also includes a first electrically conductive layer and a second electrically conductive layer between which the first electro-optic layer is disposed. A first substrate is disposed adjacent the first electrically conductive layer. A second electro-optic layer comprising electro-optic material is stacked relative to the first electro-optic layer. The display also includes a third electrically conductive layer and a fourth electrically conductive layer between which the second electro-optic layer is disposed. A second substrate is disposed adjacent the fourth electrically conductive layer. A shared substrate is disposed between the first and second electro-optic layers. The second electrically conductive layer is disposed on one side of the shared substrate and the third electrically conductive layer is disposed on another side of the shared substrate. The first, second and shared substrates are formed in a shape that has at least one outer peripheral edge boundary, excluding any ledges. Internal ledges are disposed inside the at least one outer peripheral edge boundary. A first of the internal ledges comprises a portion of the first substrate and an exposed portion of the first electrically conductive layer. A second of the internal ledges comprises a portion of the shared substrate and an exposed portion of the second electrically conductive layer. A third of the internal ledges comprises a portion of the shared substrate and an exposed portion of the third electrically conductive layer. A fourth of the internal ledges comprises a portion of the second substrate and an exposed portion of the fourth electrically conductive layer.

Referring to specific features of the second aspect of this disclosure, the second and third internal ledges can be aligned with each other in a top view. The display can comprise a light absorbing layer that absorbs light passing through the first and second electro-optic layers. The electro-optical material of the first and second electro-optic layers can comprise cholesteric liquid crystal material. The display can comprise a third electro-optic layer comprising cholesteric liquid crystal material; the third electro-optic layer being stacked relative to the first and second electro-optic layers, and fifth and sixth layers of electrically conductive material between which the third electro-optic layer is disposed.

When using the third electro-optic layer, the first substrate can be disposed between the first and third electro-optic layers. The first electrically conductive layer is disposed on one side of the first substrate and the sixth electrically conductive layer is disposed on another side of the first substrate. A fourth substrate is disposed adjacent the fifth electrically conductive layer. The first, second, shared and fourth substrates are formed in the shape that has the at least one outer peripheral edge boundary, excluding any ledges. A fifth of the internal ledges comprises a portion of the fourth substrate and an exposed portion of the fifth electrically conductive layer. A sixth of the internal ledges comprises a portion of the first substrate and an exposed portion of the sixth electrically conductive layer.

As further specific features of the three electro-optic layer display, the sixth and first internal ledges can be aligned with each other in a top view and the second and third internal ledges can be aligned with each other in a top view. The display can comprise a light absorbing layer that absorbs light passing through the first, second and third electro-optic layers.

Any of the features described in the first aspect of the disclosure may apply to the second aspect of the disclosure in any combination. In addition, any of the features disclosed in the Detailed Description and/or shown in the drawings can be used along with any of the above specific features in any combination.

A third general aspect of the disclosure features an electronic display comprising an electro-optic layer comprising electro-optical material, a first electrically conductive layer and a second electrically conductive layer, the electro-optic layer being disposed between the first and second electrically conductive layers. A first substrate is disposed adjacent the first electrically conductive layer and a second substrate is disposed adjacent the second electrically conductive layer. The first and second substrates are formed in a shape that has at least one outer peripheral edge boundary, excluding any ledges. Internal ledges are disposed inside the at least one outer peripheral edge boundary. A first of the internal ledges comprises a portion of the first substrate and an exposed portion of the first electrically conductive layer and a second of the internal ledges comprises a portion of the second substrate and an exposed portion of the second electrically conductive layer. A first pass-through opening is formed through the first substrate and the exposed portion of the first electrically conductive layer and a second pass-through opening is formed through the second substrate and the exposed portion of the second electrically conductive layer.

Referring to specific features of the third aspect of the disclosure, the exposed portion of the first electrically conductive layer and the exposed portion of the second electrically conductive layer can be annular. A conductive material can be filled in the display in electrical contact with the exposed portion of the first electrically conductive layer and through the first pass through opening and filled in the display in electrical contact with the exposed portion of the second electrically conductive layer and through the second pass through opening. The first and second internal ledges are optionally completely internal to the display such that the first and second internal ledges do not extend to the at least one peripheral edge boundary of the display. The third aspect can apply to Type 1, 2 or 3 ledges.

Any of the features described in the first and second aspects of the disclosure may apply to the third aspect of the disclosure in any combination. In addition, any of the features disclosed in the Detailed Description and/or shown in the drawings can be used along with any of the above specific features in any combination.

The following additional aspects of the disclosure apply to any of the aspects herein. The display can be a writing tablet, for example, as disclosed in one or more of U.S. patent application Ser. No. 13/281,911 (Cholesteric Liquid Crystal Writing Tablet with Spacer Controlled Sensitivity); U.S. patent application Ser. No. 12/787,843 (Writing Tablet Information Recording Device); U.S. Pat. No. 8,228,301 (Multiple Color Writing Tablet); and U.S. Pat. No. 8,139,039 (Selectively Erasable Electronic Writing Tablet), all of which are incorporated herein by reference in their entireties. The display can be an electronic skin, for example, as disclosed in U.S. Pat. No. 8,310,630 (Electronic Skin Having Uniform Gray Scale Reflectivity), which is incorporated herein by reference in its entirety. In another aspect, the electronic display may not be designed to be permanently attached to any drive electronics (e.g., in the case of the display functioning as liquid crystal paper which is described below). In particular, the electro-optic material can comprise (e.g., cholesteric) liquid crystal material. Yet another aspect features an electrical addressing (e.g., erasing) device that is not designed to be permanently attached to, but is co-operable with, any of the electronic displays disclosed herein, wherein the electrical addressing device comprises drive electronics that apply a voltage or at least one voltage pulse to the exposed portion of the first electrically conductive layer of the first ledge and to the exposed portion of the second electrically conductive layer of the second ledge to change an optical state of the electro-optical material. Reference to exposed portions of the electrically conductive layers in all aspects of this disclosure covers displays with integrated drive electronics in which the drive electronics are designed to be permanently connected to the electrically conductive layer on the ledges (i.e., not designed to be repeatedly connected and disconnected), such as what the conductive paste or pins/rivets are applied/fastened to on Type 3 internal ledges), as well as to liquid crystal paper in which the drive electronics are repeatedly connected and disconnected from the exposed electrically conductive layers on the internal ledges of the display. That is, the exposed portions of the electrically conductive layers are exposed to enable electrical connection to the drive electronics.

Many additional features, advantages and a fuller understanding of example embodiment will be had from the accompanying drawings and the detailed description that follows. It should be understood that the above Brief Description describes example embodiments in broad terms while the following Detailed Description describes example embodiments more narrowly and presents specific embodiments that should not be construed as necessary limitations of what is broadly defined in the claims.

BRIEF DESCRIPTION OF THE DRAWINGS

FIG. 1a is a top view of a Prior Art display with integrated, permanently attached drive electronics, the display including external ledges;

FIG. 1b is a side view of the display of FIG. 1a;

FIG. 2a is a top view of a display according to this disclosure including Type 1 internal ledges;

FIG. 2b is a side view of the display of FIG. 2a;

FIG. 2c is a top view of a display having a variation of Type 1 internal ledges that are partially outside of the active area boundary;

FIG. 3a is a top view of a display according to this disclosure with Type 2 internal ledges;

FIG. 3b is a side view of the display of FIG. 3a;

FIG. 3c is a top view of a display having a variation of Type 2 internal ledges with an active area boundary located inside the display's outer peripheral edges or its perimeter;

FIG. 4a is a top view of a display according to this disclosure with Type 3 completely internal ledges;

FIG. 4b is a side view of the display of FIG. 4a;

FIG. 4c is a top view of a display having a variation of Type 3 completely internal ledges with a pass through opening in each ledge;

FIG. 4d is a side view of the display of FIG. 4c;

FIG. 5a is a top view of a display having offset Type 1 internal ledges; FIG. 5b is a top view of a display having offset Type 2 internal ledges and FIG. 5c is a top view of a display having offset Type 3 completely internal ledges;

FIG. 7a is a top view of a "two sided" display suitable for tiling with other similar displays having Type 2 internal ledges on one edge of the display and prior art external ledges on another edge of the display;

FIG. 7b is a top view of a "four-sided" display suitable for tiling with other similar displays having Type 2 internal ledges on two edges of the display and prior art external ledges on another two edges of the display;

FIGS. 8a and 8b are top views illustrating the tiling process of two-sided displays shown in FIG. 7a;

FIGS. 10a and 10b show top views illustrating the tiling process of two-sided and four-sided displays, respectively, having square corners;

FIGS. 11a and 11b are top views of displays having Type 1 internal ledges with different bezels that are used depending on the positioning of the ledges on the perimeter of the display, proximity of the ledges to each other, and design preferences;

FIG. 13a is a top view of a display having Type 3 completely internal ledges with bezels and FIG. 13b is a side view of the display of FIG. 13a;

FIG. 14a is a top view of a stacked two electro-optic layer display with Type 2 internal ledges; and FIG. 14b is a side view of the display of FIG. 14a;

FIGS. 15a and b are top and side views of a display similar to that of FIG. 14a, b except that adjacent ledges on the shared substrate are aligned in the top view;

FIG. 16a is a top view of a stacked three electro-optic layer display with Type 2 internal ledges; and FIG. 16b is a side view of the display of FIG. 16a;

FIGS. 17a and b are top and side views of a display similar to that of FIG. 16a, b except that adjacent ledges on each of the shared substrates are aligned in the top view; and FIG. 18a illustrates a top view of a device for applying a voltage or at least one voltage pulse to the exposed portions of the electrically conductive layers of any of the Type I or Type II internal ledges of this disclosure, which device is not designed to be permanently attached to the ledges of the display but cooperates therewith to change the optical state of the electro-optical material;

FIGS. 18b and c are side views of the device in FIG. 18a without the display.

DETAILED DESCRIPTION

Figure 6B:
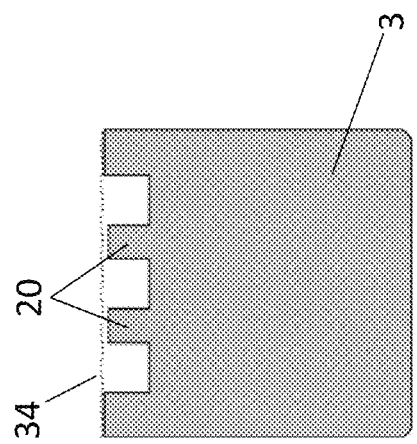
FIG. 6 a-c show top views of example displays having Type 1 internal ledges, made according to this disclosure.

Prior art flexible displays using polymer substrates have been largely used in eWriters or eSkins where there are few electrical contacts to the display. The transparent electrodes in the display are coarsely patterned or not patterned at all in cases where the display is used as an eWriter that is addressed with a pen to show a hand written image from the pressure of the tip of the pen. That is, the electrodes extend continuously across the active area of the display. The electrodes serve to apply a voltage necessary to erase the image (U.S. Pat. No. 6,104,448, which is incorporated herein by reference) or to create a negative image (U.S. Pat. No. 8,228,301), which is incorporated herein by reference. In the case of an eSkin, the electrodes are used to change the color of the skin (U.S. patent application Ser. No. 12/729,678, which is incorporated herein by reference). An illustration of the design of such displays is shown in FIG. 1. FIG. 1a shows the top view of the display with ledges (1, 2) extending beyond the edge of the display boundary 4 that encompassed the active area 3 of the display and also generally coincided with an outer peripheral edge boundary of the display, excluding the ledges (shown in dotted lines in FIG. 1a). The drive circuit 14 is permanently incorporated into the display device and is used to electronically drive the display which in the case of the eWriter erases or otherwise operates the display in mode A as described in U.S. Pat. No. 8,228,301, or in mode A, mode B or multimode as disclosed in this patent or in the other writing tablet patents or patent applications by the assignee that are incorporated by reference herein. In the case of an eSkin, the drive circuit 14 that is permanently electrically connected to the eSkin would change the color of the display. In a pixelated display invoking more than two electrodes, the drive circuit 14 that was permanently incorporated into the display was used to electrically address an image on the display. When the display is incorporated in a device such as an eWriter a bezel covers the external ledges 1, 2 as well as the remainder of the display exposing only the active area 3. FIG. 1*b* illustrates the side view detailing the various components of the display stack showing substrates 8 and 9 with ledges 1 and 2. Each of substrates 8 and 9 as well as ledges 1 and 2 are coated with a transparent electrical conductor 5. The lower substrate is coated with a light absorbing material 6 to provide contrast to the reflective display. The cholesteric liquid crystal material 7 is the material that creates the image. Each ledge 1, 2 is comprised of a portion of one of the substrates 8, 9 and an overlapping portion of one of the electrical conductors 5. In the case of an eWriter, the liquid crystal material 7 is pressure sensitive to display the image created by the stylus of the pen (U.S. Pat. No. 6,104,448 which is incorporated by reference); the drive circuit 14 is used to erase the written image. In the case of an eSkin (electronic skin), the liquid crystal material 7 changes color in response to the drive circuit 14.

One method to produce an interconnect is a type of sleeve/sticker interconnect to power and control the displays. In this type of connection method one ledge 1 would be placed on top of this connection pad, the other ledge 2 underneath it. Once the ledges are in place a spacer is placed on top of this ledge region, the top of the case would then hold the entire construction together. This type of interconnect works well for an external ledge design, but has limitations when incorporated into an internal ledge design.

Another way to connect the electronics 14 (to allow driving and control) to an external ledge of a standard prior art display (1, 2) is a type of spring clip interconnect. For this type of interconnect a strategically bent piece of metal (to create a spring arm) is used to not only provide an electrical connection to the ledge but also provide a holding force to the region.

Other interconnect methods are possible as would be apparent to those skilled in the art in view of this disclosure.
Type 1 Internal Ledges:

Three alternate internal ledge variations, Type 1, Type 2 and Type 3 are described in this disclosure. The Type 1 internal ledge is shown in FIG. 2. The prior art external ledge shown in FIG. 1 has a single transition point where the ledge comes from/attaches to its respective substrate (8, 9). This is also true for the Type 1 internal ledges of this disclosure (10, 11) as shown in FIG. 2. For Type 1 ledges (10, 11) all of the material surrounding the ledge is removed to create a gap or buffer zone 12 (e.g., on two sides of each ledge between the ledge and surrounding substrate and its electrically conductive layer) to help prevent shorting at the ledge region. This design type is also created with a very similar technique to the prior art ledge manufacturing process. The prior art procedure that is used for ledge creation would need minor modification to allow the ledges (10, 11) to be inside of the active area boundary (4) shown by the dotted lines (which in this example substantially coincides with the outer peripheral edge boundary of the display excluding the ledges). It should be apparent that while the internal ledges are within the active area boundary (4) they do not contribute to the active area because they lack liquid crystal material and an opposing electrically conductive layer.

With the ledges internalized, design liberties can be utilized to incorporate the internal ledges (10, 11) into a slimmed down case. In a display utilizing Type 1 ledges the active area (3) extends up and around the cavities created for the ledges. However, the active area boundary (4) shown in dotted lines in FIG. 2 typically follows the overall shape of the display (in this case a square) and is understood to border the outside edge(s) of each Type 1 internal ledge; the internal ledges are understood to be within this active area boundary (as opposed to defining the active area boundary as traveling along the gaps on either side of the ledge). The internal ledges are also within the outer peripheral edge boundaries of the display also shown by the dotted lines (4) in this figure. In this FIG. 2 and other figures of the disclosure reference to the at least outer peripheral edge boundary means the boundary aligned with one or more edges of the display, e.g., in this case the internal ledges are disposed inside the top edge boundary as well as inside all of the other three outer peripheral edge boundaries of the display.

In this layout each of the ledges (10, 11) are recessed to within the display active area (3) and within the active area boundary (4), the display being in the shape of a square with rounded corners. The single ledge to display path that is standard in current displays is still present. The internal ledges (10, 11) do not extend beyond the active area boundary (4). In FIG. 2*a*, the active area (3) is in proximity to three sides of each ledge. The display that includes the internal ledges (10, 11) shown in FIG. 2, includes the gap (12) surrounding each ledge (10, 11) in which there is no substrate or outer layer within the active area boundary (4).

In FIG. 2*b* the ledge side view of a Type 1 (10, 11) internal ledge design is shown. In this view the make-up of the display can be seen. The display is constructed by placing two or more plastic films or substrates (8, 9) with their respective conductive layers (5) facing each other with a liquid crystal material (7) (e.g., cholesteric liquid crystal material dispersed in polymer including optional spacers) placed between the two conductive layers (5). As shown in the drawing (FIG. 2*b*) by the dotted boxes a portion of one of the plastic substrate films (8, 9), a portion of one of the electrically conductive layers (5) and a portion of the liquid crystal material (7) directly above or below (17) the ledges (11, 10), respectively, is removed to allow access to the exposed conductive side (5) of the two ledges (10, 11). That is, each ledge (10, 11) comprises a portion of one of the substrates (8, 9) and an exposed portion of one of the electrically conductive layers (5) which would usually be in contact with the substrate. Also in FIG. 2*b* the gaps (12) between the body of the display and the two sides of each of the ledges (10, 11) can be seen. This void region (12) can be increased or decreased as required to minimize the risk of shorting between the two conductive layers (5) or as indicated by design specifications. A Type 1 ledge (10, 11) can be located anywhere along the perimeter of the display. This could include having one of the ledges (10, 11) on one side and the other on a completely different side of the display. The Type 1 ledge (10, 11) concept is likely the easiest to implement.

In FIG. 2*b* a light absorbing (e.g., black) back coating (6) is shown on the lower most substrate film (9) to improve contrast during use. A Type 1 ledge type (10, 11) will work independently of the back layer (6) or color of the back layer (6). The back light absorbing layer (6) need not be present on the ledge (10, 11).

The method of fabricating the ledges could be laser and die cutting ledge making processes. With the Type 1 ledges (10, 11) (FIG. 2), discussed above, the standard ledge making process can be utilized with some changes to allow for the internal nature of the ledges (10, 11). They could also be cut with a laser or die at the end of the process with a precision cut that only penetrates the appropriate layer(s) (8, 9) of film. The associated conductive layer (5) and liquid crystal material (7) would also need to be removed. Another variation would be to cut these regions initially and rely on targets or another alignment process to register the proposed display region with future steps.

This internal ledge design (10, 11) could be used in situations where a smaller footprint on the side containing the ledge is desired. To create this smaller footprint the ledges can even be a hybrid of a Type 1 ledge (or Type 2 or Type 3 ledge) and the prior art ledge (FIG. 2c). To this end, the internal ledges can be partially contained (31) within the perimeter and partially outside (32) to create a completely customizable solution. Although such an internal ledge could extend beyond (32) the at least one outer peripheral edge boundary (4) and/or active area boundary (4) by any distance, in one example, a majority of the area of a side surface of the internal ledge is within (31) the outer peripheral edge boundary (4) and/or the active area boundary (4) and a portion of an area of the ledge extends outside the outer peripheral edge boundary and/or active area boundary. In this example the active area boundary is substantially aligned with the outer peripheral edge boundary. A Type 1 ledge (10, 11) could also be made completely internal but would take up much more display area than the other internal ledge types described in this disclosure.

To better convey the internal ledge concept a traditional squared off rectangular ledge shape was used in FIG. 2. When used in potential applications any shape or size could be used to design the Type 1 internal ledge (10, 11).

A Type 1 internal ledge could be driven in a similar manner as a prior art external ledge. The spring clip interconnect will work on Type 1 (10, 11) internal ledge designs. For this design a spring clip mechanism will extend onto the internal display ledge (10, 11) and connect to the conductor (5) (providing switching control) and also providing a mechanism to hold the region stationary. The major difference between the spring clips for each of these devices is the size of the clipping region that would be in contact with the internal ledge (10, 11). This region of the clip could be designed/made into any size to allow for optimal connectability between the electronics and display. The one spring clip would compress the lower most internal ledge (11) (conductor facing up) toward the case, the other spring clip would likely compress the other internal ledge (10) (conductor facing down) to a back stop on the spring clip.

The sleeve/sticker interconnect, magnetic, and spring clip connector are examples of how Type 1 internal ledges (10, 11) could be connected to drive electronics. Some other examples of how the drive electronics can be attached to the conductive layer (5) include pressure contact, heat seal bond, conductive pins and other industry standard connection schemes depending on the application and conductive substrate (5).

Drive and/or control electronics 14 are shown for each of the electronic displays of this disclosure using Type 1, 2 or 3 ledges and can be integral with the display as in the Boogie Board® writing tablet or not designed to be permanently attached to but cooperable with the electronic display as in the case of Liquid Crystal Paper (e.g., as shown in FIG. 18 discussed below). This can be used to erase and/or electrically address the display so that it displays a particular color or image. The electrically conductive layers of all of the displays disclosed herein can be patterned (e.g., a passive matrix) or not (e.g., a continuous coating over the entire active area or substrate). It should be appreciated that the specific manner of connection of the drive electronics 14 to the ledges, whether designed to be permanently attached to the electronic display or not, is not apparent from FIGS. 2a, 3a and 4a, but would be apparent to one of ordinary skill in the art in view of this disclosure.

The conducting electrodes on the ledges are electrically connected to electronic write circuitry 14 that provides suitable voltages to the conducting electrodes, usually in the form of one or more voltage pulses, as is used to initialize or erase an image or operate the display in Mode A, Mode B or multimode in order for pressure of the stylus to create an image or select erase as described in U.S. Patent Application Publications 2009/0033811 and 2009/0096942 and U.S. Pat. No. 8,228,301, which are incorporated herein by reference in their entireties. In the case of the display having integrated drive and/or control electronics this permanent connection can be made with electrical interconnects. A discussion of the manner of applying suitable voltages or voltage pulses to the writing tablet alone or along with application of writing pressure using integrated drive electronics, is discussed in the U.S. Pat. No. 8,228,301, especially paras. [0022] to [0070] and the corresponding drawings.

The drive electronics can be similar to those described in U.S. Pat. No. 8,310,630 (Electronic Skin Having Uniform Gray Scale Reflectivity), which is incorporated herein by reference in its entirety, and can electrically erase or address the images. The voltage applied to the electronic display is a pulse or sequence of pulses. The waveform and magnitude of the voltage pulse (or pulses) to switch the display are well known in the art of a bistable cholesteric liquid crystal displays; e.g., U.S. Pat. No. 5,453,863; 5,691,795 or 5,889,566 which patents are incorporated herein by reference in their entireties. Selecting the various waveforms and magnitudes of the clearing or addressing voltage for the liquid crystal layer would be apparent to one of ordinary skill in view of this disclosure. The drive electronics discussed above may be integrated into the display device itself in the case of electronic skin as the electronic display, which can be attached to a portable electronics device (e.g., a cell phone). The electronic skin may use drive electronics built into the portable electronics device to which it is attached. On the other hand, the drive electronics may be separate from and not designed to be permanently attached to the electronic display as in the case of the electronic paper as the electronic display, which is discussed below. The electronic skin may merely change colors when electrically addressed, or it may also be written on.

Type 2 Internal Ledges:

Type 2 internal ledges, shown in FIG. 3, incorporate multiple transition points from the ledge to the main body of the display. For this type, the internal ledges (15, 16) are not cantilevered from a single connection point (as are prior art external ledges) but remain attached to a substrate (8, 9) (or outer layer) on three or fewer sides within the display. This internal ledge (15, 16) offers a higher level of robustness compared to a standard cantilever external ledge (prior art). In FIG. 3b the side view of a Type 2 design of internal ledge (15, 16) is shown. The display is constructed in a similar manner as Type 1 internal ledges with the major difference being the construction of the ledge. As shown in the drawing (FIG. 3b) by the dotted boxes a portion of one of the plastic substrate films (8, 9), a portion of one of the electrical conductors (5) and a portion of the liquid crystal material directly above or below (17) the ledges (16, 15), respectively, is removed to allow access to the conductive side (5) of both internal ledges (15, 16). Each of the internal ledges (15, 16) comprises a portion of one of the substrates (8, 9) and a portion of one of the electrically conductive layers (5), which normally is in contact with that substrate. Also in FIG. 3b there are no gaps between the body of the display and the sides of the internal ledge (15, 16); the ledge transitions into the body of the display on each of the connecting sides. A Type 2 internal ledge (15, 16) can be located anywhere along the perimeter of the display. This could include having one of the internal ledges (15, 16) on one side and the other on a completely different side of the display. This approach is riskier to implement due to the possibility of shorts near the internal ledges (15, 16).

The method of fabricating the internal ledges could be laser or die cutting ledge making processes. With the Type 2 (15, 16) internal ledges (FIG. 3) discussed above the standard ledge making process can be utilized with some changes to allow for the internal nature of the ledges (15, 16). They could also be cut with a laser or die at the end of the process with a precision cut that only penetrates the appropriate layer(s) (8, 9) of film (and portion of one of the electrically conductive layers (5) and portion of the liquid crystal layer (7)). Another variation would be to cut these regions initially and rely on targets or another alignment process to register the proposed display region with future steps.

To better convey the internal ledge concept a traditional squared off rectangular ledge shape was used in FIG. 3. When used in potential applications any shape or size could be used to design the Type 2 internal ledge (15, 16).

As discussed above, a portion of one of the plastic substrate films, a portion of one of the electrically conductive layers and a portion of the liquid crystal material directly above or below each of the ledges, respectively, is removed to allow access to the conductive side of each ledge. Type 2 internal ledges, and Type 3 completely internal ledges described below, may experience minimized shorting when the material is cut away using a laser, as this may cause an insulating area around the cut out material (e.g., the other substrate, electrically conductive layer and liquid crystal material directly above or below the ledge). Voltage may also be initially applied in such a way to the electrodes in displays having such Type 2 and Type 3 internal ledges, so as to burn out any potential shorts.

With the ledges internalized, design liberties can be utilized to incorporate the internal ledges (15, 16) into a slimmed down case. In a display utilizing a Type 2 internal ledge, the active area (3) extends up and around the cavities created for the ledges. However, the active area boundary (4) shown in dotted lines in FIG. 3 typically follows the overall shape of the display (in this case a square) and is understood to border the outside edge(s) of each Type 2 internal ledge; the internal ledges are understood to be within this active area boundary. The internal ledges are also within the outer peripheral edge boundaries of the display also shown by the dotted lines (4) in this figure.

As discussed above, the active area boundary (4a) could be located more inwardly of the at least one outer peripheral edge boundary (4b) (FIG. 3c). In this drawing the active area boundary (4a) is retracted to inside all of the four outer peripheral edge boundaries (4b) of the display. This creates the active area (3) and the region(s) (33) outside of the active area boundary (4a) but still within the display outer peripheral edge boundaries (4b). This region (33) may be functional, but destined to be covered in a later step or nonfunctional (not switchable by the drive electronics). For example, the electrically conductive layers can be patterned or unpatterned (e.g., a continuous electrode layer across the active area). One example is a low resolution patterned display. The design of the internal ledges for use with a patterned display would be apparent to one skilled in the art in view of this disclosure. A display with patterned electrically conductive layers can form a passive matrix display in which the patterned conductors do not extend to the outer peripheral edge boundaries of the display (e.g., are contained in the region (3)). Also, the outer peripheral edge of the display can be formed in any of a variety of ways, for example, laser welding, ultrasonic welding, chemical sealing, die cutting, and using adhesives or gaskets. This may result in a region just inside the outer peripheral edge that does not contain functional liquid crystal and/or electrically conductive material (which may be, for example, on the order of microns or millimeters). In such displays, such as shown in FIG. 2a, the active area boundary while shown located in alignment with the outer peripheral edge boundary, in actual fact, may be located slightly inside of the outer peripheral edge boundary. As shown in FIG. 3c, the active area boundary (4a) may even be located a significant distance inside the outer peripheral edge boundaries (4b). In one variation, the internal ledges (e.g., ledges 15 and 16) could extend so as to touch the more inwardly located active area boundary (4a). For example, this design could be used where the electrically conductive layers are patterned and are only disposed inside active area (3). The internal ledges are within the at least one outer peripheral edge boundary (4b) and/or the active area boundary (4a). This internal ledge design (15, 16) could also be used in situations where a smaller footprint on the side containing the ledge is desired. To create this smaller footprint the ledges can even be a hybrid of the designs shown above (15, 16) and the prior art ledge. The internal ledges (15, 16) can be partially contained within the perimeter and partially outside to create a completely customizable solution. To this end, although such an internal ledge could extend beyond the at least one outer peripheral edge boundary and/or active area boundary (4) by any distance, in one example, a majority of the area of a side surface of the internal ledge is within the outer peripheral edge boundary and/or active area boundary (4) and a portion of the area of the internal ledge is located outside the outer peripheral edge boundary and/or the active area boundary.

In FIG. 3b a light absorbing (e.g., black) back coating (6) is shown on the lower most substrate film (9) to improve contrast during use. A Type 2 ledge type (15, 16) will work independent of the back layer (6) or color of the back layer (6). The back light absorbing layer (6) need not be present on the ledge (15, 16).

A Type 2 internal ledge could be driven in a similar manner as a prior art external ledge. The spring clip interconnect will work on Type 2 (15, 16) internal ledge designs. For each of the designs a spring clip mechanism will extend onto the display ledge (15, 16) and connect to the conductor (5) (providing switching control) and also providing a mechanism to hold the region stationary. The major difference between the spring clips for each of these devices is the size of the clipping region that would be in contact with the internal ledge (15, 16). This region of the clip could be designed/made into any size to allow for optimal connectability between the electronics and display. The one spring clip would compress the lower most internal ledge (16) (conductor facing up) toward the case, the other spring clip would likely compress the other internal ledge (15) (conductor facing down) to a back stop on the spring clip. The spring clip interconnect may be covered by the housing of the display device, or housing of any electronics device to which it is attached, or not covered by a housing in this and all aspect of this disclosure.

The sleeve/sticker interconnect, magnetic and spring clip connector are examples of how Type 2 internal ledges (15, 16) could be connected to drive electronics. Some other examples of how the drive electronics can be attached to the conductive layer (5) include pressure contact, heat seal bond, conductive pins and other industry standard connection schemes depending on the application and conductive substrate (5).

If a Type 2 internal ledge (15, 16) were made into a completely internal ledge, it is considered a Type 3 ledge in this disclosure.

Type 3 Internal Ledges:

Based on the internal nature of the second condition mentioned above, the idea of an internal ledge can be expanded to also include a ledge that is completely internal. Type 3 completely internal ledges, an example of which is shown in FIG. 4, are completely surrounded by the active area (3) for specialized applications or for an increase in ledge ruggedness. The completely internal ledges do not extend to the at least one outer peripheral edge boundary. Therefore, a Type 3 internal ledge must be interfaced with through a side surface (41) of the display. A ledge that is completely internal (18, 19) could offer designers a product opportunity that previously wasn't considered. In FIG. 4*b* the side view of a Type 3 design of internal ledges (18, 19) is shown. The display is also constructed in a similar manner as Type 1 internal ledges with the major difference being the construction of the ledge. As shown in the drawing (FIG. 4*b*) by the dotted boxes a portion of one of the plastic substrate films, a portion of one of the electrical conductors (5) and a portion of the liquid crystal material directly above or below (17) each of the internal ledges (19, 18), respectively, is removed to allow access to the conductive side (5) of each ledge (18, 19). Each of the internal ledges (18, 19) comprises a portion of one of the substrates (8, 9) and a portion of one of the electrically conductive layers (5), which usually would be in contact with that substrate. For a Type 3 internal ledge design (18, 19), the ledges can essentially be located anywhere within the display. To create a Type 3 internal ledge (18, 19) a portion of one of the films is removed (i.e., a region designated (17) including a portion of one of the substrates (8, 9), a portion of one of the electrically conductive layers (5) and a portion of the liquid crystal layer (7)) (i.e. a round hole) to expose the opposing conductive layer (5). Each of the completely internal ledges (18, 19) comprises a portion of one of the substrates (8, 9) and a portion of one of the electrically conductive layers (5), which usually would be in contact with that substrate. This same process is repeated for the other film(s)/substrate(s) to expose their conductive layer(s) (5). While circular ledges are shown, it should be appreciated that the completely internal ledges (18, 19) could have any other shapes such as rectangular or square. Of the three internal ledge types, a Type 3 ledge would be the riskiest to implement.

The method of fabricating the ledges could be laser and die cutting ledge making processes. With Type 3 internal ledges (18, 19) (FIG. 4) discussed above the standard ledge making process can be utilized with some changes to allow for the internal nature of the ledges (18, 19). Type 3 internal ledges (18, 19) (FIG. 4) could also be cut with a laser or die at the end of the process with a precision cut that only penetrates the appropriate layer(s) (8, 9) of film. The associated conductive layer (5) and liquid crystal material (7) would also need to be removed. Another variation would be to cut these regions initially and rely on targets or other alignment process to register the proposed display region with future steps.

In FIG. 4*b* a light absorbing (e.g., black) back coating (6) is shown on the lower most substrate film (9) to improve contrast during use. Displays with Type 3 internal ledges (18, 19) work independent of the back layer (6) or color of the back layer (6). The back light absorbing layer (6) need not be present on the internal ledge (18, 19).

With the ledges internalized, design liberties can be utilized to incorporate the internal ledges (18, 19) into a slimmed down case. In a display utilizing Type 3 ledges, the active area (3) extends up and around the entire cavities created for the ledges.

A Type 3 completely internal ledge could also be driven in a similar manner as a prior art external ledge.

A Type 3 completely internal ledge ("pass-through") design that enhances display ruggedness and functionality is described in the following. This type of internal ledge, shown in FIG. 4 *c* and *d*, is circular, for example, and completely surrounded by an active area (3), for example. In FIG. 4*d* the side view of this design of completely internal ledges (18, 19) is shown. As shown in the drawing (FIG. 4*d*) by the dotted boxes a portion of one of the plastic substrate films, a portion of one of the electrically conductive layer (5) and a portion of the liquid crystal material (7) directly above or below (17) each of the ledges (19, 18), respectively, is removed to allow access to the conductive side (5) of each ledge (18, 19). Ledge (18) comprises a portion of substrate (8) and an exposed portion of adjacent conductor (5) and ledge (19) comprises a portion of substrate (9) and an exposed portion of adjacent electrically conductive layer (5). Furthermore, as shown in the drawing (FIG. 4*d*) by the dotted box a smaller hole (30) of plastic that is concentric to the larger hole (17) is removed to create a pass-through in the exposed portion of each completely internal ledge (18, 19). This pass-through allows an electrical connection to be made on the opposite side of the conductor. For this type of ledge design (18, 19), the completely internal ledges can essentially be located anywhere within the display. To create this type of ledge (18, 19) a portion of one of the films (8 or 9), a portion of conductive layer (5) and a portion of the liquid crystal layer (7) are removed (i.e., a larger round hole (17) is formed) to expose the opposing conductive layer (5). This same process is repeated for the other ledge and the other film(s) on the opposing side of the display to expose their conductive layer(s) (5). The smaller hole (30) is made in a substrate and conductor (5) for each ledge and through the back layer of a ledge to form the pass-through openings. While circular ledges are shown, it should be appreciated that the completely internal ledges (18, 19) could have any other shapes such as rectangular or square.

Having concentric circles, as with this type of internal ledge (FIG. 4 *c, d*), gives the display ruggedness while also allowing increased functionality. As a final step, for example, the ledge area could be filled with a conductive material (i.e., conductive epoxy). The smaller hole (FIG. 4*c, d*) (30) acts as a pass-through allowing the display to be electrically connected, via the conductive material, from both sides of the display. With the pass-through region filled in with a conductive material the display can be electrically switched with the top side facing up or down when inserted into a switching device. In terms of ruggedness the design acts as an anchoring point, created by the conductive material, similar to that of a rivet through sheet metal.

In FIG. 4*d* a light absorbing (e.g., black) back coating (6) is shown on the lower most substrate film (9) to improve contrast during use. Displays with Type 3 ledges (18, 19) work independent of the back layer (6) or color of the back layer (6). The back light absorbing layer (6) need not be present on the ledge (18, 19).

In FIG. 4 *c, d*, the pass-through ledge concept is applied to a Type 3 ledge design. However, it should be appreciated that the pass-through ledge concept discussed above could also be implemented in a Type 1, Type 2 or prior art external ledge design. For example, if the Type 3 internal ledges of FIG. 4*c,d* are moved to the outer peripheral edge boundary, a Type 2 ledge having a pass-through opening would be formed. It should also be apparent that the pass-through concept (e.g., as shown in FIGS. 4c, d) could be used in a display having one or more additional electro-optic layers, conductors and substrates such that one or both of the substrates shown in FIG. 4d is an interior substrate and the openings that expose the conductors and/or pass-through openings could pass through more substrates, conductors and liquid crystal layers than just one of each.

In FIG. 5a an alternative location for Type 1 internal ledges is shown. The ledges (10, 11) are moved directly next to each other and offset towards one side of the display. In FIG. 5a the active area (3) is in close proximity to two sides of each ledge (10, 11). This type of design could prove very advantageous for a display that requires a connection point in a corner.

It should be appreciated that a Type 1 internal ledge (10, 11) can be located anywhere along the perimeter of the display. This could include having one of the ledges (10, 11) on one side (or edge) and the other on a completely different side (or edge) of the display. In FIG. 5b an alternative location for Type 2 internal ledges is shown. A Type 2 ledge (15, 16) can be located anywhere along the perimeter of the display. This could include having one of the ledges (15, 16) on one side (or edge) and the other on a completely different side (or edge) of the display. As with the first design a variation with the ledges (15, 16) moved closer together and offset can be seen in FIG. 5b. The active area (3) could be located on three sides of each Type 2 internal ledge (when rectangular shaped ledges are used).

In FIG. 5c an alternative, offset location for Type 3 ledges is shown. For a Type 3 ledge design (18, 19), the ledges can essentially be located anywhere within the active area of the display. The active area (3) completely surrounds each ledge.

To better convey the internal ledge concept traditional squared off rectangular ledge shapes were used in FIGS. 5a and 5b. When used in potential applications any shape or size could be used to design the internal ledge (10, 11, 15, 16, 18, 19).

The disclosure will now be described by reference to the following examples, which should not be used to limit the invention as defined by the claims in any way.

Examples

Multiple samples of the Type 1 internal ledge design were fabricated on our display manufacturing line. The samples represented two different product group sectors.

Figure 6C:
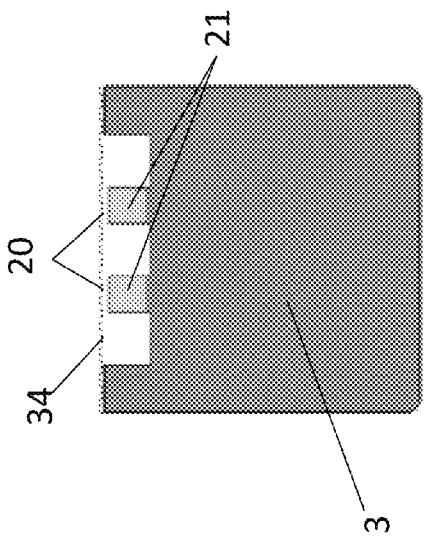
Figure 6A:
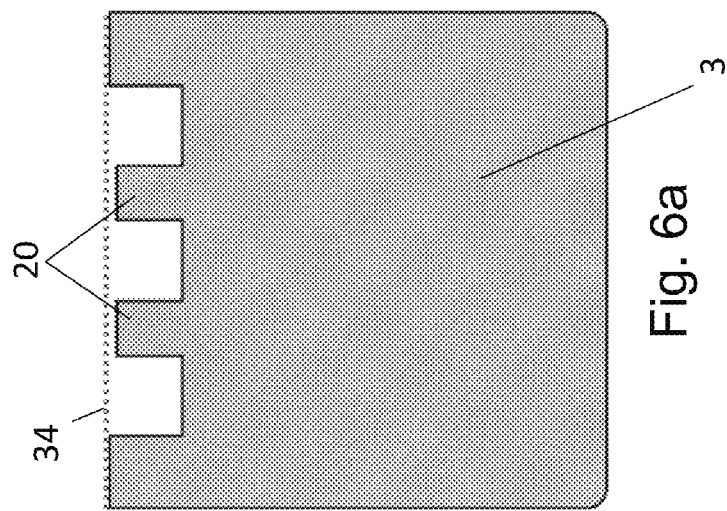

1. Prototypes were created offline using panels (2 mil plastic film on 2 mil plastic film) fabricated with the manufacturing line of Kent Displays Inc. The displays of FIGS. 6b and 6a were each made with Type 1 ledges with a side view very similar to FIG. 2b. The primary difference is the lack of the back coating. FIGS. 6b and 6a also show that the same ledge type can be used on displays of various sizes (FIG. 6b (small), FIG. 6a (large)). In each of the above two figures, the ledge regions (20) are at the top of the pictures and are internal to the upper outer peripheral edge boundary (34) of the display excluding ledges (i.e., an imaginary line (34) extending horizontally in each display of FIG. 6 in line with the outermost (upper) edge of the display of the outer two crown tips, in the orientation shown). The middle two crown tips (20) were intended to be used as the ledges. Displays were cut out to resemble small versions of the Boogie Board® display (FIGS. 6b and 6a). The internal ledges (20) on the Boogie Board® display versions of this initial test contained idealized versions of the internal ledges to show the concept, not necessarily what would be the most practical design for an actual product. To better convey the internal ledge concept a traditional squared off rectangular ledge shape was used in FIG. 6. When used in potential applications any shape or size could be used to design the internal ledge (20).

2. Prototype displays were created using 5 mil plastic film on 7 mil plastic film using the Type 1 ledge design as shown in FIG. 6c. For this prototype the ledge region (20) is at the top of the drawing. The ledge was created from the two middle crown tips (20), with one conductor facing up and one down. The back of the construction also contained the back coating used on current standard displays by Kent Displays Inc. Some of the samples were hand ledged (FIG. 6c) and switched using a power supply and function generator to verify the new ledge format would function as intended. The conductors on the ledges of the hand ledged displays received a coating of liquid silver (21) to improve the connection with the power supply. The switched displays functioned normally with all of the regions switching as expected. Multiple sample displays were cut out to resemble small versions of the Boogie Board® display (FIG. 6c).

The internal ledge concept has several other applications including but not limited to: tiling of small displays to make a large display, unique bezel designs, and two, three or more layer stacked displays.

FIG. 7 shows a potential tiling application for internal ledges. Ledge Type 2 (15, 16) would work well for an application requiring the tiling of multiple displays directly next to each other. In FIG. 7a a two face (or two edge) ledge concept is shown. In this design a standard prior art external ledge design (1, 2) (sticks outside the active area boundary at the perimeter of the display) is incorporated on one side (or edge) with a Type 2 internal ledge design (15, 16) on the other side (or edge) of the display. FIGS. 1b and 3b show the side views of each respective ledge design.

This same modular display component can be modified from the two face (or two edge) design to one that allows four sided (or four edged) modular expansion of the displays (FIG. 7b).

It should be appreciated that the displays of this disclosure can be formed in any shape. Especially when the outer peripheral edges of the polymer substrates are cut (e.g., by laser welding), each display can have any shape including those without straight edges or with a lesser or greater number of straight edges than a rectangle or square. The display can include at least one arcuate portion and can even be circular. When tiling such displays, the other displays would have a complementary shape. For example, one can envision the tiling displays to have the various shapes (outer peripheral profile) of pieces of a typical puzzle game and the complementary shapes of other interlocking puzzle pieces in which case there are no straight edges, one straight edge or two straight edges on each display tile (like the various puzzle pieces), for example. The display tile would have at least one of the internal ledges at one location near the outer peripheral edge boundary, and at least one external ledge, spaced apart from the internal ledge, extending beyond the outer peripheral edge boundary at another location of the display.

To better convey the internal ledge concept a traditional squared off rectangular ledge shape was used in FIG. 7. When used in this application any shape or size could be used to design the ledges. It should also be appreciated that a Type 1 ledge could be used as a replacement to the Type 2 ledges shown.

Figure 8B:
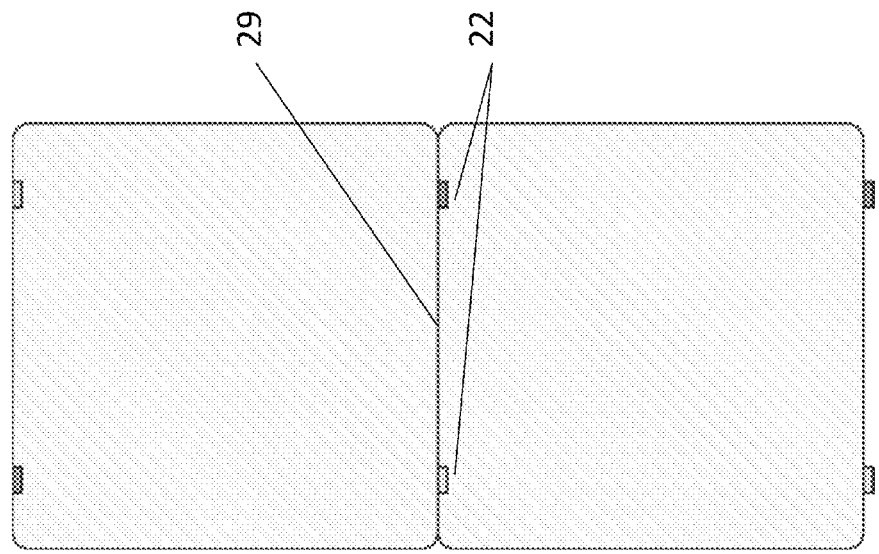

By utilizing these two different ledge types (1, 2, 15, 16), one internal or external ledge is able to be overlaid and connected to the opposite ledge on the next tile (22) (FIG. 8). Once the displays are mated together, there can potentially be a tight connection (29) (minimal gap) between the two neighboring displays (FIG. 8b). This process could be repeated to produce a modular display of multiple rows and columns with a perimeter of various shapes and sizes.

To better convey the internal ledge concept a traditional squared off rectangular ledge shape was used in FIG. 8. When used in this application any shape or size could be used to design the ledges. It should also be appreciated that a Type 1 ledge could also be used as a replacement to the Type 2 ledges shown.

Figure 8A:
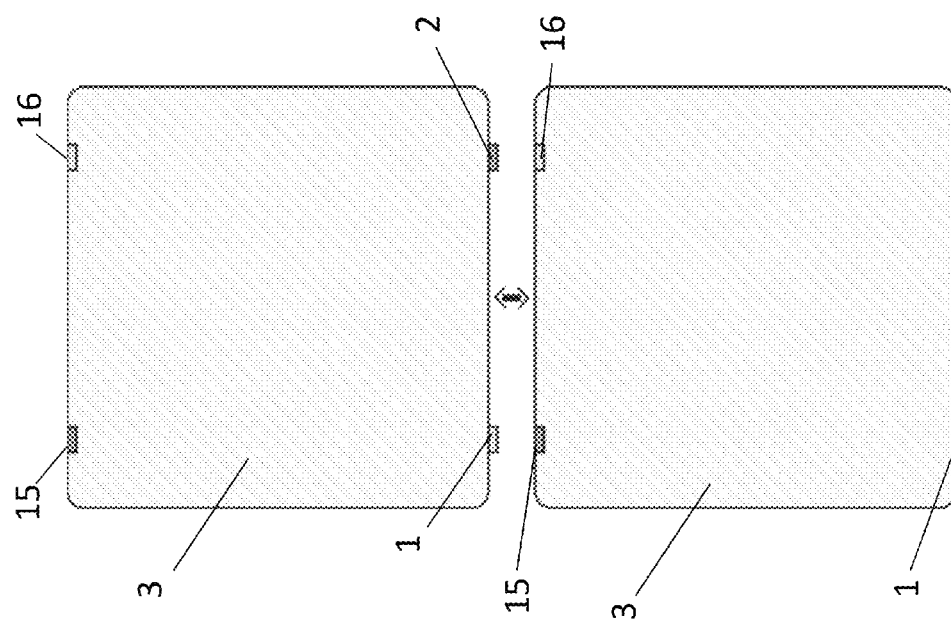
Figure 9B:
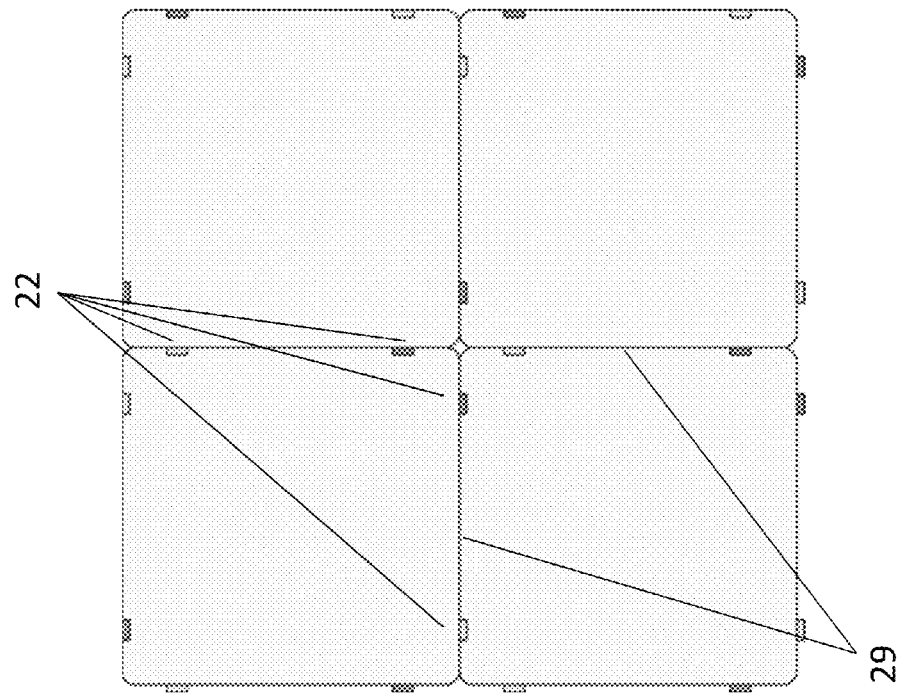
FIGS. 9a and 9b are top views illustrating the tiling process of four-sided displays shown in FIG. 7b.
Figure 9A:
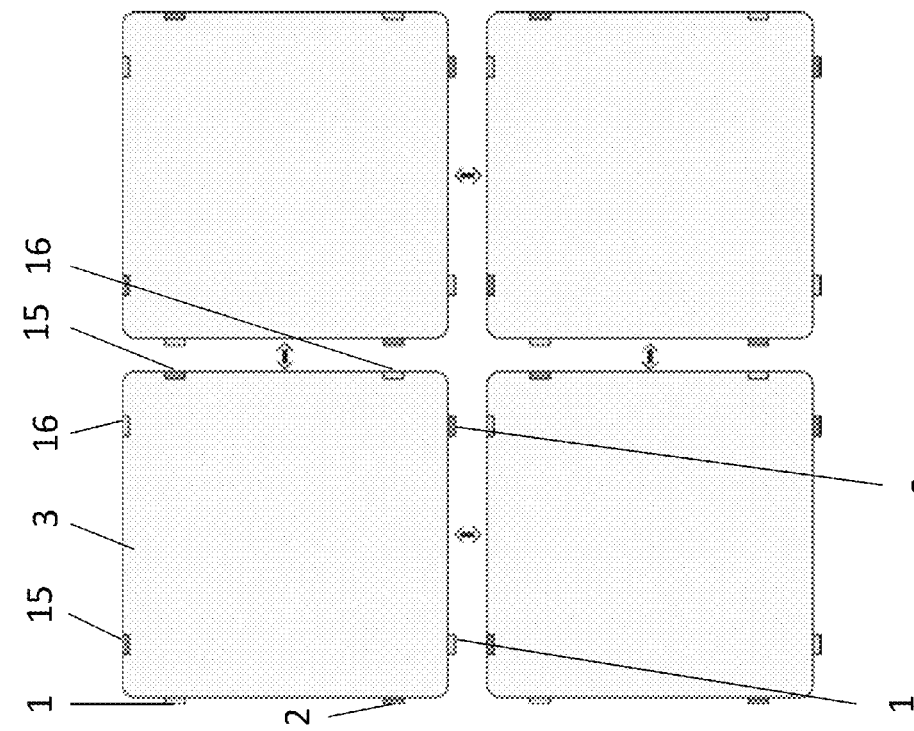

As was shown in FIGS. 8a and 8b for a two face (or two edged) display, FIG. 9 shows a possible connection scheme for multiple, tiled four face (or four edged) displays. A four face display offers a couple of advantages over the two face version. Having ledges (1, 2, or 15, 16) on each side of the display creates an increased level of ruggedness by increasing redundancy by creating multiple electrical pathways to each display. When tiled it also creates a stronger structure by having each display connected to its neighbor (22). The four face design structure would likely be riskier to implement than the two face version. It should be appreciated that the modular display can include any number of two and/or four faced tiles and each display can have one, two, three or more liquid crystal layers. For example, the displays suitable for tiling can be stacked, multiple liquid crystal layer displays that each reflect red, green and blue light to produce full color on the display (such as when using gray scale), including writing or drawing lines or images in various colors on the writing tablet or eWriter.

To better convey the internal ledge concept a traditional squared off rectangular ledge shape was used in FIG. 9. When used in this application any shape or size could be used to design the ledges. It should also be appreciated that a Type 1 ledge could also be used as a replacement to the Type 2 ledges shown.

In order to improve the functional nature of a tiled display the corners of the displays that will be in contact with other displays can be squared (FIG. 10). Depending on the requirements of the application some corners could be rounded whereas some could be squared.

To better convey the internal ledge concept a traditional squared off rectangular ledge shape was used in FIG. 10. When used in this application any shape or size could be used to design the ledges. It should also be appreciated that a Type 1 ledge could also be used as a replacement to the Type 2 ledges shown.

In FIG. 11a, a possible bezel design is shown skirting the perimeter of the display. In any type of finished product some sort of protective bezel (23) design will likely be incorporated around the entire display, just the ledges or a portion of the display/ledges. At the regions with the ledges (10, 11) the bezel (23) may need to protrude into the display active area (3) slightly further to allow for the internal nature of the ledges. The portion of the display covered by the bezel is not considered to be part of the active area even if it includes liquid crystal between two electrically conductive layers. An alternative bezel (23) design (FIG. 11b) could have the bezel (23) only around the ledge region (10, 11) offering protection and a mechanism to connect to an off-device switching unit.

To better convey the internal ledge concept a traditional squared off rectangular ledge shape was used in FIG. 11. When used in potential applications any shape or size could be used to design the internal ledge (10, 11).

Figure 12A:
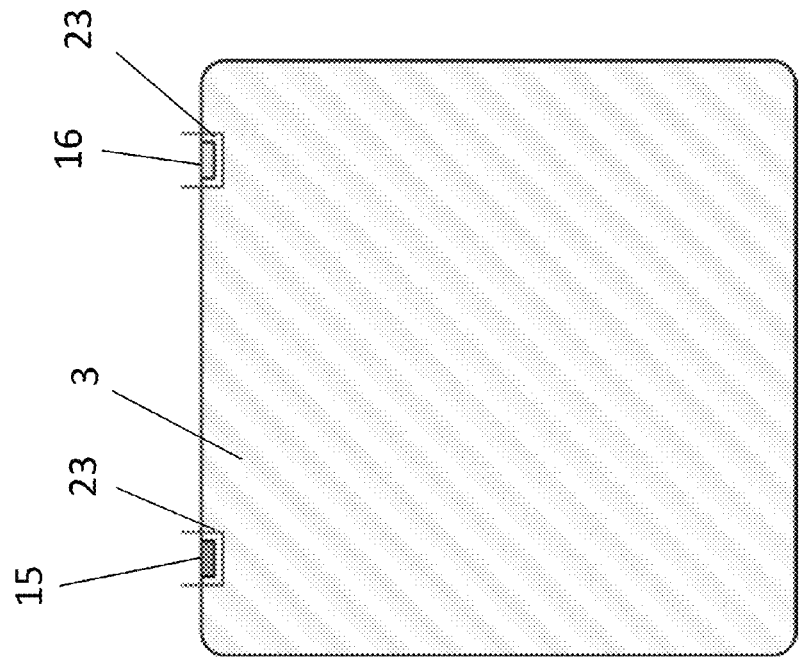
FIGS. 12a and 12b are top views of displays having Type 2 internal ledges with different bezels that are used depending on the positioning of the ledges on the perimeter of the display, proximity of the ledges to each other, and design preferences.
Figure 12B:
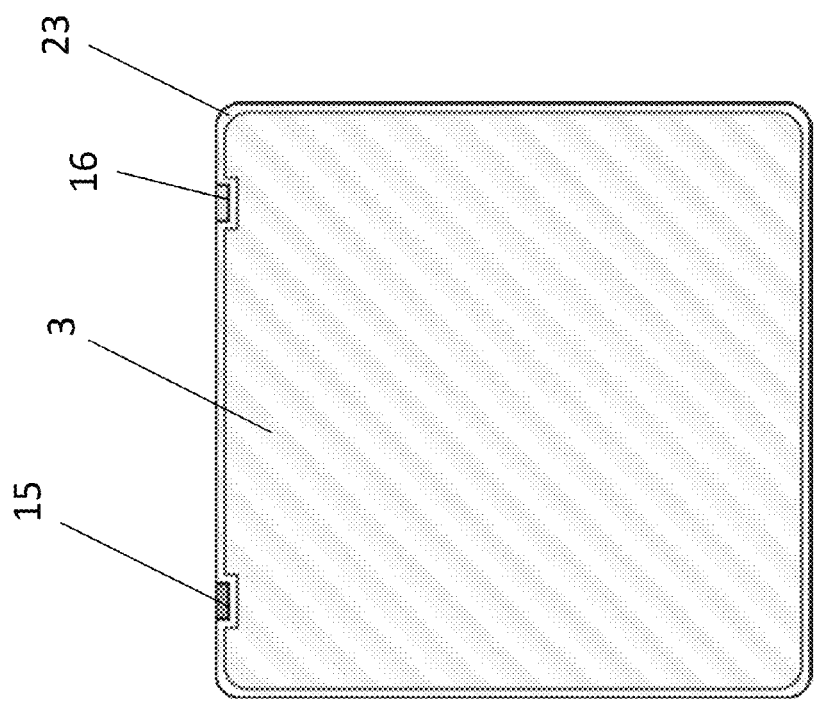

The bezels (23) for Type 1 and Type 2 ledges are very similar in how they would be designed and function (Type 2 (15, 16) bezel (23) being shown in FIG. 12). In FIG. 12b, another version of a minimalist approach to a bezel for a Type 2 ledge design (15, 16) is shown. The bezel (23) requirements for each of these various ledge designs are similar to standard product lines of Kent Displays Inc. with the major difference being the overall external footprint of the bezel (23) (the footprint could shrink for internal ledges).

To better convey the internal ledge concept a traditional squared off rectangular ledge shape was used in FIG. 12. When used in potential applications any shape or size could be used to design the internal ledge (15, 16).

As shown in FIG. 13, the bezel requirements for a Type 3 internal ledge differ somewhat from the bezels needed for Type 1 and 2 internal ledges. For a Type 3 internal ledge (18, 19) design an outside perimeter bezel can be incorporated into the display design or at a minimum a bezel (23) around the internal ledge region (18, 19) to offer support and ruggedness to the interconnect mechanism (24) (FIG. 13).

For a Type 3 (18, 19) ledge design, a spring clip interconnect could work if the ledge region is close enough to a perimeter to make the connection scheme appropriate. More than likely a type of pin interconnect (24) could be used to provide functionality to the display. One concept that could be used for this application involves inserting a pin (24) into the cutout region (17) of each side of the display. This pin (24) could have a conductive core with an optional insulating exterior (limit shorting potential). The conductive core could connect to a conductive pad on the end of the pin that would be in contact to the conductor (5) of the ledge (18, 19). This pin (24) could then be adhered to the display (around the perimeter of the pin (24)) when designed for permanent connection to drive electronics, using an adhesive to improve ruggedness and to provide an adequate level of connectivity to the ledge (18, 19) conductor (5) (FIG. 13b). The adhesive and pin (24) regions could then be covered by a bezel (23) (FIG. 13a). A similar arrangement possibly employing two, movable and non-adhered conductive pins entering from each side of each ledge of the display into electrical contact with one another could be used to apply voltages to the conductive layers (5) of the display having completely internal ledges as shown in FIGS. 4c, d (when designed for non-permanent attachment to drive electronics).

The spring clip connector and pin (24) are two examples of how Type 3 internal ledges (18, 19) could be connected to electronics. Some other examples of how the drive electronics can be attached to the conductive layer (5) include pressure contact, heat seal bond, and other industry standard connection schemes depending on the application and conductive substrate (5).

To better convey the internal ledge concept a circular ledge shape was used in FIG. 13. When used in potential applications any shape or size could be used to design the internal ledge (18, 19).

In FIG. 13b a light absorbing (e.g., black) back coating (6) is shown on the lower most substrate film (9) to improve contrast during use. A Type 3 ledge type (18, 19) will work independent of the back layer (6) or color of the back layer (6). The back light absorbing layer (6) need not be present on the ledge (18, 19).

It should also be noted that in the above referenced figures two substrate films (8, 9) are represented with their respective two internal ledges. The internal ledge design types discussed in this disclosure could also be implemented in displays utilizing more than two substrate films/two ledges.

FIG. 14 shows a possible ledge orientation for creating a two liquid crystal layer (7) display using a Type 2 ledge design (15, 16). Shared substrate (25) includes a conductive layer (5) on both sides thereof. Lower substrate (9) is adjacent a conductive layer (5) and liquid crystal (7) is disposed between the substrates (9) and (25). Upper substrate (8) is adjacent a conductive layer (5). Liquid crystal (7) (right side in the figure), which may be the same or different as liquid crystal (7) of the other display (left side of the figure), is disposed between the substrates (25) and (8).

A multiple layer, stacked display device offers a multitude of advantages over a single layer display. In a multiple layer, stacked display device additional liquid crystal colors can be used in their own individual layer (7). That is, each liquid crystal layer (7) can reflect a different color of light than other liquid crystal layers (7) in the device. This not only adds additional color options to the displays but enhances the gray scale options as well. Additional layers could also be used to potentially improve the contrast of the image being written with electronics or with a stylus.

As an alternative to using a two conductive layer-sided (shared) substrate to create a multiple layer display, multiple single layer displays could be stacked on top of one another, each display sandwiching the liquid crystal material between two substrates, each substrate being disposed adjacent an inner electrically conductive layer. The displays would be coupled together with index of refraction matching material or an adhesive between adjacent substrates of the displays, which likely would be optically transparent.

In FIG. 14b a light absorbing (e.g., black) back coating (6) is used on the lower most substrate film (9) to improve contrast during use. A Type 2 internal ledge type (15, 16) will work independently of the back layer (6) or color of the back layer (6). The back light absorbing layer (6) need not be present on the internal ledge (15, 16).

To better convey the internal ledge concept a traditional squared off rectangular ledge shape was used in FIG. 14. When used in potential applications any shape or size could be used to design the internal ledge (15, 16). A similar ledge layout/construction would also apply for Type 1 and Type 3 internal ledge designs when stacked in a similar manner.

FIG. 15 shows an alternative ledge layout for a two liquid crystal layer (7) display device. In this drawing the two sided or shared substrate (25) containing a conductor (5) on both sides thereof has the ledges for the substrate moved back to back or aligned as represented schematically by the middle ledge (26) in FIG. 15(a). This layout (26) not only reduces the active area (3) occupied by the ledges (15, 16) in a stacked multilayer display but could incorporate a single interconnect for both conductive layers (5) on the shared substrate (25).

As an alternative to using a two sided substrate to create a multiple layer display, multiple single layer displays could be stacked on top of one another, each display sandwiching the liquid crystal material between two substrates, each substrate being disposed adjacent an inner electrically conductive layer. The displays could be coupled together with index of refraction matching material or an adhesive between adjacent substrates of the displays, which likely would be optically transparent.

In FIG. 15b a light absorbing (e.g., black) back coating (6) is shown on the lower most substrate film (9) to improve contrast during use. A Type 2 internal ledge type (15, 16) will work independent of the back layer (6) or color of the back layer (6). The back light absorbing layer (6) need not be present on the ledge (15, 16).

To better convey the internal ledge concept a traditional squared off rectangular ledge shape was used in FIG. 15. When used in potential applications any shape or size could be used to design the internal ledge (15, 16). A similar ledge layout/construction would also apply for Type 1 and Type 3 ledge designs when stacked in a similar manner.

FIG. 16 shows a possible ledge layout for a three liquid crystal layer (7) stacked display device, again utilizing a Type 2 internal ledge (15, 16). Here there are two shared substrates (25) as discussed above and outer substrates (9) and (8), each substrate including a conductive layer (5) disposed on one or both sides thereof as shown. One lower liquid crystal layer (7) is disposed between the lower substrate (9) and the shared substrate (25) toward the left side of the figure; another middle liquid crystal layer (7) is disposed between the adjacent shared substrates (25); and another upper liquid crystal layer (7) is disposed between shared substrate (25) to the right side of the figure and upper substrate (8).

If required these ledge types could continue being used to create more than the three layers demonstrated.

As an alternative to using a two sided substrate to create a multiple layer display, multiple single layer displays could be stacked on top of one another, each display sandwiching the liquid crystal material between two substrates and each substrate being disposed adjacent an inner electrically conductive layer. The displays could be coupled together with index of refraction matching material or an adhesive between adjacent substrates of the displays, which likely would be optically transparent.

In FIG. 16b a light absorbing (e.g., black) back coating (6) is shown on the lower most substrate film (9) to improve contrast during use. A Type 2 internal ledge type (15, 16) will work independent of the back layer (6) or color of the back layer (6). The back light absorbing layer (6) need not be present on the ledge (15, 16).

To better convey the internal ledge concept a traditional squared off rectangular ledge shape was used in FIG. 16. When used in potential applications any shape or size could be used to design the internal ledge (15, 16). A similar ledge layout/construction would also apply for Type 1 and Type 3 internal ledge designs when stacked in a similar manner.

As with a two liquid crystal layer (7) display, if adjacent ledges (15, 16) on the double sided substrates (25) are stacked or aligned with each other as represented schematically by the two middle ledges (26), a reduction in ledge area is also achieved for a three layer display (FIG. 17).

If required these ledge types could continue being used to create more than the three layers demonstrated.

As an alternative to using a two sided substrate to create a multiple layer display, multiple single layer displays could be stacked on top of one another, each display sandwiching the liquid crystal material between two substrates and each substrate being disposed adjacent an inner electrically conductive layer. The displays could be coupled together with index of refraction matching material or an adhesive between adjacent substrates of the displays, which likely would be optically transparent.

In FIG. 17b a light absorbing (e.g., black) back coating (6) is shown on the lower most substrate film (9) to improve contrast during use. A Type 2 internal ledge type (15, 16) will work independent of the back layer (6) or color of the back layer (6). The back light absorbing layer (6) need not be present on the ledge (15, 16).

To better convey the internal ledge concept a traditional squared off rectangular ledge shape was used in FIG. 17. When used in potential applications any shape or size could be used to design the internal ledge (15, 16). A similar ledge layout/construction would also apply for Type 1 and Type 3 internal ledge designs when stacked in a similar manner.

One application of internal ledges is on what is referred to herein as "liquid crystal paper." Liquid crystal paper has similar properties as normal writing paper but, unlike paper, does not need to be discarded after use; it can be cleared and reused many times over. Like normal writing paper, liquid crystal paper is a thin, flexible sheet that has no electronic circuitry permanently attached. One uses liquid crystal paper in the same way normal writing paper is used for hand writing or drawing pictures. An untethered, pointed stylus is used to write on the liquid crystal paper but with the advantage that it does not have to be a pencil or pen but only a pointed object which could even be ones finger nail. After use, the liquid crystal paper can be cleared or erased for reuse. This can be accomplished by a stand-alone device (FIG. 18a) with electronics that provides a voltage pulse or pulses (14) to electrodes on a sheet of liquid crystal paper (38) to clear it. A sheet (38) that needs to be cleared is inserted in or attached to the device (37) that applies a voltage pulse or pulses (14) to the electrodes of sufficient magnitude to clear the sheet. The erasing device (36) that erases the liquid crystal paper (38) is not designed to be permanently connected to the liquid crystal paper (38); it is designed to be repeatedly connected and disconnected from the electrodes on the ledges. In contrast to liquid crystal paper, electronic displays with integrated drive electronics are not designed for repeated connection and disconnection between the drive electronics and the display device. It should be appreciated that the electro-optical material could be something other than liquid crystal material in the example embodiments, consistent with the remainder of this disclosure. The erasing device (36) comprises a housing including electrical contacts (37) that detachably connect with the electrically conductive leads on the internal ledges. Drive electronics (14) apply a voltage to the contacts for erasing the liquid crystal paper (38) as described in U.S. patent application Ser. No. 13/621,367, which is incorporated herein by reference in its entirety. The erasing device (36) can include a switch/button (35) enabling the voltage from the drive electronics (14) to be applied to the contacts (37) and to erase the liquid crystal paper (38).

An illustration of an example of an erasing device with spring loaded contacts is given in FIG. 18. In this device (36), the liquid crystal paper (38) or other internal ledge display could be switched by inserting the ledge region into the adjustable switching head (37). Inside the "U" shaped component (37) would be electrical contacts (39, 40) that would allow the drive circuit (14) to interface with the display (38). The upper electrical contacts (39) would be for one leg of the drive circuit (14) whereas the lower electrical contacts (40) would be connected to the other leg. By doubling up the upper (39) and lower (40) contacts the display (38) could be switched with the top side facing up or down. Pressing the spring loaded contacts (37) of the erasing device (36) against the contacts of the liquid crystal paper may trigger the erasing device (36) to apply erasing voltage pulses (14) to the liquid crystal paper (38) thereby erasing or clearing the image. The contacts (37) could also function with the button (35) controlling the gap between the electrical interface pads (39, 40) while engaging the drive circuit (14) for display control. It may also be possible to have a switch that would be tripped when the display (38) ledge region is inserted into the switching head (37) activating a head (37) closing/display switching sequence.

It should be appreciated that the switching device (36) shown in FIG. 18 could be used to switch Type 1, 2 and 3 internal ledges and also prior art ledges with some modifications.

Many modifications and variations of the example embodiments herein will be apparent to those of ordinary skill in the art in light of the foregoing disclosure. Therefore, it is to be understood that, within the scope of the appended claims, the example embodiments can be practiced otherwise than has been specifically shown and described.

What is claimed is:

1. An electronic display comprising:
an electro-optic layer comprising electro-optical material,
a first electrically conductive layer and a second electrically conductive layer, said electro-optic layer being disposed between said first electrically conductive layer and said second electrically conductive layer,
a first substrate disposed adjacent said first electrically conductive layer and a second substrate disposed adjacent said second electrically conductive layer, said first substrate and said second substrate being formed in a shape that has at least one outer peripheral edge boundary, excluding any ledges, and
internal ledges disposed inside the at least one outer peripheral edge boundary, a first of said internal ledges comprising a portion of said first substrate and an exposed portion of said first electrically conductive layer and a second of said internal ledges comprising a portion of said second substrate and an exposed portion of said second electrically conductive layer.

2. The electronic display of claim 1 wherein said first internal ledge and said second internal ledge also extend outside the at least one said outer peripheral edge boundary.

3. The electronic display of claim 2 wherein a majority of a side surface area of said first internal ledge and said second internal ledge is disposed inside the at least one outer peripheral edge boundary.

4. The electronic display of claim 1 wherein there is a gap in said first substrate around at least one side of said first internal ledge and there is a gap in said second substrate around at least one side of said second internal ledge.

5. The electronic display of claim 1 wherein there is no gap in said first substrate around said first internal ledge and there is no gap in said second substrate around said second internal ledge.

6. The electronic display of claim 1 wherein said first internal ledge and said second internal ledge are completely internal to the display such that said first internal ledge and said second internal ledge do not extend to the at least one said peripheral edge boundary.

7. The electronic display of claim 1 wherein said display is a tiling display comprising at least one selected said internal ledge disposed at one location near the at least one said outer peripheral edge boundary, and at least one ledge, spaced apart from said selected internal ledge, extending outside the at least one said outer peripheral edge boundary at another location of the display.

8. The electronic display of claim 7 wherein the at least one outer peripheral edge is selected from the group consisting of: arcuate shaped, no straight edges, one straight edge, two straight edges; more than two straight edges and combinations thereof.

9. The electronic display of claim 1 wherein said display is a tiling display and at least one of said first internal ledge and said second internal ledge is disposed near one of said outer peripheral edge boundaries, further comprising at least one external ledge that extends outside another one of said outer peripheral edge boundaries.

10. The electronic display of claim 1 wherein said display is a tiling display comprising two internal ledge sets each including said first internal ledge and said second internal ledge, said internal ledge sets extending near first and second said outer peripheral edge boundaries, respectively, further comprising two external ledge sets each including external ledges, said external ledge sets extending outside third and fourth said outer peripheral edge boundaries, respectively.

11. The electronic display of claim 1 comprising integrated drive electronics that apply a voltage or at least one voltage pulse to said exposed portion of said first electrically conductive layer of said first internal ledge and to said exposed portion of said second electrically conductive layer of said second internal ledge, to change an optical state of said electro-optical material.

12. The electronic display of claim 1 wherein said electro-optical material comprises cholesteric liquid crystal material.

13. The electronic display of claim 12 wherein said cholesteric liquid crystal material is dispersed in a polymer matrix.

14. The electronic display of claim 1 comprising a layer of a light absorbing material that absorbs light that passes through said electro-optical material.

15. The electronic display of claim 12 including at least one other layer of cholesteric liquid crystal material stacked over said electro-optic layer, and other layers of electrically conductive material between which said other layer of cholesteric liquid crystal material is disposed.

16. The electronic display of claim 1 wherein said electro-optical material comprises liquid crystal material containing an additive dichroic dye material.

17. The electronic display of claim 1 wherein an active area defined by an active area boundary is formed by said electro-optic layer disposed between said first electrically conductive layer and said second electrically conductive layer.

18. The electronic display of claim 17 wherein said first internal ledge and said second internal ledge extend to or within said active area boundary.

19. The electronic display of claim 18 wherein a majority of a side surface area of said first internal ledge and said second internal ledge is within said active area boundary.

20. The electronic display of claim 1 wherein said display is a writing tablet.

21. The electronic display of claim 1 wherein said display is an electronic skin.

22. The electronic display of claim 1 which is not designed to be permanently attached to any drive electronics.

23. The electronic display of claim 22 wherein said electro-optic material comprises liquid crystal material.

24. An electrical addressing device that is not designed to be permanently attached to but is cooperable with said electronic display of claim 22, wherein said electrical addressing device comprises drive electronics that apply a voltage or at least one voltage pulse to said exposed portion of said first electrically conductive layer of said first ledge and to said exposed portion of said second electrically conductive layer of said second ledge to change an optical state of said electro-optical material.

25. An electronic display comprising:
a first electro-optic layer comprising electro-optical material,
a first electrically conductive layer and a second electrically conductive layer between which said first electro-optic layer is disposed,
a first substrate disposed adjacent said first electrically conductive layer,
a second electro-optic layer comprising electro-optic material stacked relative to said first electro-optic layer,
a third electrically conductive layer and a fourth electrically conductive layer between which said second electro-optic layer is disposed,
a second substrate disposed adjacent said fourth electrically conductive layer,
a shared substrate disposed between said first electro-optic layer and said second electro-optic layer, wherein said second electrically conductive layer is disposed on one side of said shared substrate and said third electrically conductive layer is disposed on another side of said shared substrate,
said first substrate, said second substrate and said shared substrate being formed in a shape that has at least one outer peripheral edge boundary, excluding any ledges, and
internal ledges disposed inside the at least one outer peripheral edge boundary, a first of said internal ledges comprising a portion of said first substrate and an exposed portion of said first electrically conductive layer, a second of said internal ledges comprising a portion of said shared substrate and an exposed portion of said second electrically conductive layer, a third of said internal ledges comprising a portion of said shared substrate and an exposed portion of said third electrically conductive layer and a fourth of said internal ledges comprising a portion of said second substrate and an exposed portion of said fourth electrically conductive layer.

26. The electronic display of claim 25 wherein said second internal ledge and said third internal ledge are aligned with each other in a top view.

27. The electronic display of claim 25 comprising a light absorbing layer that absorbs light passing through said first electro-optic layer and said second electro-optic layer.

28. The electronic display of claim 25 wherein said electro-optical material of said first electro-optic layer and said electro-optical material of said second electro-optical layer comprise cholesteric liquid crystal material.

29. The electronic display of claim 28 comprising a third electro-optic layer comprising cholesteric liquid crystal material, said third electro-optic layer being stacked relative to said first electro-optic layer and said second electro-optic layer, and a fifth electrically conductive layer and a sixth electrically conductive layer between which said third electro-optic layer is disposed.

30. The electronic display of claim 29 wherein said first substrate is disposed between said first electro-optic layer and said third electro-optic layer, wherein said first electrically conductive layer is disposed on one side of said first substrate and said sixth electrically conductive layer is disposed on another side of said first substrate, comprising a fourth substrate disposed adjacent said fifth electrically conductive layer,
said first substrate, said second substrate, said shared substrate and said fourth substrate being formed in said shape that has the at least outer peripheral edge boundary, excluding any ledges, and
a fifth of said internal ledges comprising a portion of said fourth substrate and an exposed portion of said fifth electrically conductive layer, and a sixth of said internal ledges comprising a portion of said first substrate and an exposed portion of said sixth electrically conductive layer.

31. The electronic display of claim 30 wherein said sixth internal ledge and said first internal ledge are aligned with each other in a top view and said second internal ledge and said third internal ledge are aligned with each other in a top view.

32. The electronic display of claim 30 comprising a light absorbing layer that absorbs light passing through said first electro-optic layer, said second electro-optic layer and said third electro-optic layer.

33. An electronic display comprising:
an electro-optic layer comprising electro-optical material,
a first electrically conductive layer and a second electrically conductive layer, said electro-optic layer being disposed between said first electrically conductive layer and said second electrically conductive layer,
a first substrate disposed adjacent said first electrically conductive layer and a second substrate disposed adjacent said second electrically conductive layer, said first substrate and said second substrate being formed in a shape that has at least one outer peripheral edge boundary, excluding any ledges,
internal ledges disposed inside the at least one outer peripheral edge boundary, a first of said internal ledges comprising a portion of said first substrate and an exposed portion of said first electrically conductive layer and a second of said internal ledges comprising a portion of said second substrate and an exposed portion of said second electrically conductive layer, and
wherein a first pass-through opening is formed through said first substrate and said exposed portion of said first electrically conductive layer and a second pass-through opening is formed through said second substrate and said exposed portion of said second electrically conductive layer.

34. The electronic display of claim 33 wherein said first internal ledge and said second internal ledge are completely internal to the display such that said first internal ledge and said second internal ledge do not extend to the at least one said peripheral edge boundary.

35. The electronic display of claim 33 comprising integrated drive electronics that apply a voltage or at least one voltage pulse to said exposed portion of said first electrically conductive layer of said first internal ledge and to said exposed portion of said second electrically conductive layer of said second internal ledge to change an optical state of said electro-optical material.

36. The electronic display of claim 33 wherein said electro-optical material comprises cholesteric liquid crystal material.

37. The electronic display of claim 36 wherein said cholesteric liquid crystal material is dispersed in a polymer matrix.

38. The electronic display of claim 36 comprising a layer of a light absorbing material that absorbs light that passes through said electro-optical material.

39. The electronic display of claim 33 wherein said electro optical material comprises liquid crystal material containing an additive dichroic dye material.

40. The electronic display of claim 33 wherein said exposed portion of said first electrically conductive layer and said exposed portion of said second electrically conductive layer are annular.

41. The electronic display of claim 33 further comprising a conductive material filled in said display in electrical contact with said exposed portion of said first electrically conductive layer and through said first pass through opening and filled in said display in electrical contact with said exposed portion of said second electrically conductive layer and through said second pass through opening.

\* \* \* \* \*